United States Patent
Winckler et al.

(10) Patent No.: US 6,420,047 B2
(45) Date of Patent: Jul. 16, 2002

(54) MACROCYCLIC POLYESTER OLIGOMERS AND PROCESSES FOR POLYMERIZING THE SAME

(75) Inventors: Steven J. Winckler, Troy; Tohru Takekoshi, Scotia, both of NY (US)

(73) Assignee: Cyclics Corporation, Schenectady, NY (US)

( * ) Notice: Subject to any disclaimer, the term of this patent is extended or adjusted under 35 U.S.C. 154(b) by 0 days.

(21) Appl. No.: 09/754,943

(22) Filed: Jan. 4, 2001

Related U.S. Application Data

(63) Continuation-in-part of application No. 09/535,132, filed on Mar. 24, 2000.
(60) Provisional application No. 60/177,727, filed on Jan. 21, 2000.

(51) Int. Cl.[7] .............................. B32B 27/06; C08F 2/32
(52) U.S. Cl. ...................... 428/480; 524/601; 524/604; 524/605; 524/801; 524/176; 524/178; 524/121; 524/155; 524/401; 528/491; 528/499; 528/503
(58) Field of Search ................................. 524/601, 604, 524/605, 801, 176, 178, 121, 155, 401; 528/491, 499, 503; 428/480

(56) References Cited

U.S. PATENT DOCUMENTS

| | | |
|---|---|---|
| 3,018,272 A | 1/1962 | Griffing et al. |
| 3,786,067 A | 1/1974 | Trockmorton et al. ...... 260/327 |

(List continued on next page.)

FOREIGN PATENT DOCUMENTS

| | | |
|---|---|---|
| BE | 676324 | 6/1966 |
| DE | 3607627 | 9/1987 |
| DE | 4034574 | 5/1992 |
| EP | 0000544 | 8/1982 |

(List continued on next page.)

OTHER PUBLICATIONS

Brunelle (1995) "Macrocycles For The Synthesis of High Molecular Weight Polymers" pp. 197–235, ch. 6, New Methods of Polymer Synthesis: vol. 2, edited by J.R. Ebdon and G.C. Eastmond.

Martin et al. (1987) "Pultrusion", *Engineered Materials Handbook:* vol. 1 Composites, pp. 533–543.

(List continued on next page.)

*Primary Examiner*—Samuel A. Acquah
(74) *Attorney, Agent, or Firm*—Testa, Hurwitz & Thibeault LLP

(57) ABSTRACT

A water slurry process is used to prepare a prepreg and to manufacture articles from macrocyclic polyester oligomers. In one embodiment, a process for preparing a water suspension of macrocyclic polyester oligomers includes the steps of contacting a macrocyclic polyester oligomer and a polymerization catalyst with water and a surfactant, and mixing the macrocyclic polyester oligomer and polymerization catalyst with water and the surfactant thereby forming a suspension. In another embodiment, a process for impregnating macrocyclic polyester oligomers for polymerization includes the steps of providing a suspension of a macrocyclic polyester oligomer and a polymerization catalyst in water, applying the suspension to a base material, drying to remove water from the suspension, and pressing the dried suspension to a desired form. In yet another embodiment, a composition of macrocyclic polyester oligomer includes a macrocyclic polyester oligomer, a polymerization catalyst, and water. In yet another embodiment, a process for polymerizing macrocyclic polyester oligomers includes the steps of mixing a blend material having a macrocyclic polyester oligomer and a polymerization catalyst with water to form a mixture, applying the mixture to a base material, drying to remove water, heating to polymerize the macrocyclic polyester oligomer, and pressing the polymerized macrocyclic polyester oligomer to a desired form.

29 Claims, 14 Drawing Sheets

ROTATIONAL MOLDING PROCESS

U.S. PATENT DOCUMENTS

| | | | |
|---|---|---|---|
| 4,605,731 A | 8/1986 | Evans et al. | 528/371 |
| 4,616,077 A | 10/1986 | Silva | 528/371 |
| 4,638,077 A | 1/1987 | Brunelle et al. | 558/281 |
| 4,644,053 A | 2/1987 | Brunelle et al. | 528/371 |
| 4,727,134 A | 2/1988 | Brunelle et al. | 528/371 |
| 4,740,583 A | 4/1988 | Brunelle et al. | 528/370 |
| 4,757,132 A | 7/1988 | Brunelle et al. | 528/357 |
| 4,816,548 A | 3/1989 | Evans et al. | 528/370 |
| 4,829,144 A | 5/1989 | Brunelle et al. | 528/176 |
| 4,831,001 A | 5/1989 | Evans et al. | 502/153 |
| 4,888,411 A | 12/1989 | Shannon et al. | 528/199 |
| 4,904,810 A | 2/1990 | Brunelle et al. | 558/281 |
| 4,980,453 A | 12/1990 | Brunelle et al. | 528/352 |
| 4,992,228 A | 2/1991 | Heck et al. | 264/135 |
| 4,999,420 A | 3/1991 | Leitz et al. | 528/371 |
| 5,006,637 A | 4/1991 | Guggenheim et al. | 528/355 |
| 5,023,346 A | 6/1991 | Schon et al. | 549/231 |
| 5,039,783 A | 8/1991 | Brunelle et al. | 528/272 |
| 5,071,711 A | 12/1991 | Heck et al. | 428/542.8 |
| 5,095,088 A | 3/1992 | Wang | 528/203 |
| 5,097,008 A | 3/1992 | Krabbenhoft et al. | 528/371 |
| 5,116,900 A | 5/1992 | Flautt et al. | 524/377 |
| 5,191,013 A | 3/1993 | Cook et al. | 524/601 |
| 5,191,038 A | 3/1993 | Krabbenhoft et al. | 525/462 |
| 5,207,850 A | 5/1993 | Parekh | 156/166 |
| 5,214,158 A | 5/1993 | Brunelle et al. | 549/267 |
| 5,225,129 A | 7/1993 | van den Berg | 264/85 |
| 5,231,161 A | 7/1993 | Brunelle et al. | 528/272 |
| 5,241,880 A | 9/1993 | Mizobata et al. | 74/502.5 |
| RE34,431 E | 11/1993 | Brunelle et al. | 528/352 |
| 5,264,548 A | 11/1993 | Brunelle et al. | 528/370 |
| 5,281,669 A | 1/1994 | Kambour et al. | 525/177 |
| 5,288,837 A | 2/1994 | Munjal et al. | 528/198 |
| 5,300,392 A | 4/1994 | Odell et al. | 430/130 |
| 5,300,393 A | 4/1994 | Odell et al. | 430/134 |
| 5,300,590 A | 4/1994 | Cook et al. | 525/444 |
| 5,302,484 A | 4/1994 | Odell et al. | 430/127 |
| 5,314,779 A | 5/1994 | Odell et al. | 430/127 |
| 5,321,117 A | 6/1994 | Brunelle | 528/272 |
| 5,340,909 A | 8/1994 | Doerr et al. | 528/276 |
| 5,348,985 A | 9/1994 | Pearce et al. | 521/124 |
| 5,356,984 A | 10/1994 | Carbone et al. | 524/431 |
| 5,386,037 A | 1/1995 | Takekoshi et al. | 549/206 |
| 5,387,666 A | 2/1995 | Takekoshi et al. | 528/283 |
| 5,389,719 A | 2/1995 | Takekoshi et al. | 524/784 |
| 5,407,984 A | 4/1995 | Brunelle et al. | 524/178 |
| 5,410,014 A | 4/1995 | Haese et al. | 528/196 |
| 5,420,226 A | 5/1995 | Hamer et al. | 528/201 |
| 5,434,244 A | 7/1995 | Warner et al. | 528/490 |
| 5,446,122 A | 8/1995 | Warner et al. | 528/279 |
| 5,466,744 A | 11/1995 | Evans et al. | 524/714 |
| 5,498,651 A | 3/1996 | Brunelle | 524/176 |
| 5,527,976 A | 6/1996 | Takekoshi et al. | 585/16 |
| 5,530,052 A | 6/1996 | Takekoshi et al. | 524/447 |
| 5,591,800 A | 1/1997 | Takekoshi et al. | 524/783 |
| 5,605,979 A | 2/1997 | Priddy, Jr. et al. | 525/439 |
| 5,637,655 A | 6/1997 | Priddy, Jr.et al. | 525/438 |
| 5,646,306 A | 7/1997 | Elsasser, Jr. | 549/267 |
| 5,648,454 A | 7/1997 | Brunelle | 528/491 |
| 5,661,214 A | 8/1997 | Brunelle et al. | 524/783 |
| 5,663,282 A | 9/1997 | Todt et al. | 528/274 |
| 5,668,186 A | 9/1997 | Brunelle et al. | 521/48 |
| 5,693,722 A | 12/1997 | Priddy, Jr. et al. | 525/439 |
| 5,700,888 A | 12/1997 | Hall | 526/190 |
| 5,707,439 A | 1/1998 | Takekoshi et al. | 106/483 |
| 5,710,086 A | 1/1998 | Brunelle et al. | 502/171 |
| 5,756,644 A | 5/1998 | Hodge et al. | 528/272 |
| 5,760,161 A | 6/1998 | Goins, Jr. et al. | 528/299 |
| 5,786,440 A | 7/1998 | Kohler et al. | 528/196 |
| 5,795,423 A | 8/1998 | Johnson | 156/166 |
| 5,830,541 A | 11/1998 | Carswell et al. | 427/475 |
| 5,936,029 A | 8/1999 | Hall | 524/572 |
| 5,968,642 A | 10/1999 | Saito | 428/304.4 |
| 6,121,466 A | 9/2000 | Osterholt et al. | 549/267 |
| 6,297,330 B1 | 10/2001 | Burch, Jr. et al. | |

FOREIGN PATENT DOCUMENTS

| | | |
|---|---|---|
| EP | 419254 A2 | 3/1991 |
| EP | 486832 A2 | 5/1992 |
| EP | 264835 B1 | 6/1992 |
| EP | 235741 B1 | 1/1993 |
| EP | 543492 A1 | 5/1993 |
| EP | 589640 A1 | 3/1994 |
| EP | 598604 A1 | 5/1994 |
| EP | 601753 A1 | 6/1994 |
| EP | 635512 A1 | 1/1995 |
| EP | 655476 A1 | 5/1995 |
| EP | 436186 B1 | 10/1995 |
| EP | 688778 A1 | 12/1995 |
| EP | 699701 A3 | 9/1996 |
| GB | 957841 | 5/1964 |
| GB | 991020 | 5/1965 |
| JP | 4621873 | 6/1971 |
| JP | 476425 | 2/1972 |
| JP | 6275547 | 4/1987 |
| JP | 02298512 | 12/1990 |
| JP | 09048876 | 2/1997 |
| JP | 2001031846 | 2/2001 |
| SU | 1077893 | 3/1984 |
| WO | 88/06605 | 9/1988 |
| WO | 91/09899 | 7/1991 |
| WO | 93/04106 | 3/1993 |
| WO | 95/30702 | 11/1995 |
| WO | 00/27632 | 5/2000 |

OTHER PUBLICATIONS

Ahjopalo, L. et al. (2000) "Cyclic Oligomers in Saturated Polyesters" Polymer, vol. 41, No. 23, 8283–8290.

Brunelle "Macrocycles For The Synthesis of High Weight Polymers" *Macromolecules*, 197–235, 1995.

Brunelle et al. (1998) "Semicrystalline Polymers via Ring–Opening Polymerization: Preparation and Polymerization of Alkylene Phthalate Cyclic Oligomers" *Macromolecules* vol. 31, 4782–4790.

Burch, R. R. et al. (2000) "Synthesis of Cyclic Oligoesters and Their Rapid Polymerization to High Molecular Weight" Macromolecules, vol. 33, No. 14, 5053–5064.

Cotton, N. J. et al. (1993) "Rate and Extend of Supercritical Fluid Extraction of Cyclic Trimer from Poly(Ethylene Terephthalate) at Elevated Temperatures" *Journal of Chromatographic Science*, vol. 31, No. 5, 157–161.

Hamilton et al. (1998) "Cyclic Polyesters: Part 8. Preparation and Characterization of Cyclic Oligomers in Six Aromatic Ester and Ether–Ester Systems" *Polymer* vol. 39, No. 14., 3241–3252.

Harrison, A. G. et al. (1997) "Analysis of cyclic oligomers of poly(ethylene terephthalate) by liquid chromatography/mass spectrometry" Polymer Communications, vol. 38, No. 10, 2549–2555.

Henshaw et al. (1994) "Recycling of a Cyclic Thermoplastic Composite Material by Injection and Compression Molding" *J. of Thermoplastic Composite Materials* vol. 7(1), 14–29.

Hubbard, P. A. (1996) "Polyesters via Macrocyclic Oligomers" Dissertation presented at the University of Akron.

Kricheldorf, H. R. et al. (1997) "Macrocycles IV. Macrocyclic Polylactones as Bifunctional Monomers for Polycondensations" *Journal of Polymer Science*, vol. 36, No. 9, 1373–1378.

Kricheldorf, H. R. et al. (1998) "Macrocycles. 3. Telechelic Polylactones via Macrocyclic Polymerization" Macromolecules, vol. 31, No. 3, 614–620.

Lattimer et al. (1998) "MALDI–MS Analysis of Pyrolysis Products From a Segmented Polyurethane" *Journal of Analytical and Applied Pyrolysis*, vol. 48, 1–15.

Liu et al. (1999) "Preparation of Cyclic Polyester Oligomers and Ultra–low VOC Polyester Coatings" *Polymer Preprints*, vol. 40, No. 1.

Martin et al. "Pultrusion" 533–543.

Miller, S. (1998) "Macrocyclic polymers from cyclic oligomers of poly(butylene terephthalate)" Dissertation Presented at University of Massachusetts, Amherst, MA US.

Mueller, F. J. et al. (1983) "Synthesis of Cyclic Oligomers of Butylene Terephthalate" *Makromol. Chem.*, vol. 184, No. 12, 2487–95.

Mueller, F. J. et al. (1983) "Synthesis of Cyclic Oligomers of Butylene Terephthalate" *Makromol. Chem.*, vol. 184, No. 12, 2487–95. (Translation).

Perovic, A. (1985) "Morphological Instability of poly(ethylene terephthalate) cyclic oligomer crystals" *Journal of Material Science*, vol. 20, Iss. 4, 1370–1374.

Perovic et al. (1982) "Crystallization of Cyclic Oligomers in Commercial Poly(ethleneterephthalate) Films" *Polymer Bulletin* vol. 6, 277–283.

Roelens, S. (1988) "Organotin–Mediated Synthesis of Macrocyclic Polyesters: Mechanism and Selectivity in the Reaction of Dioxastannolanes with Diacyl Dichlorides" *Journal of the Chemical Society, Perkin Transactions* 2, vol. 8, 1617–1625.

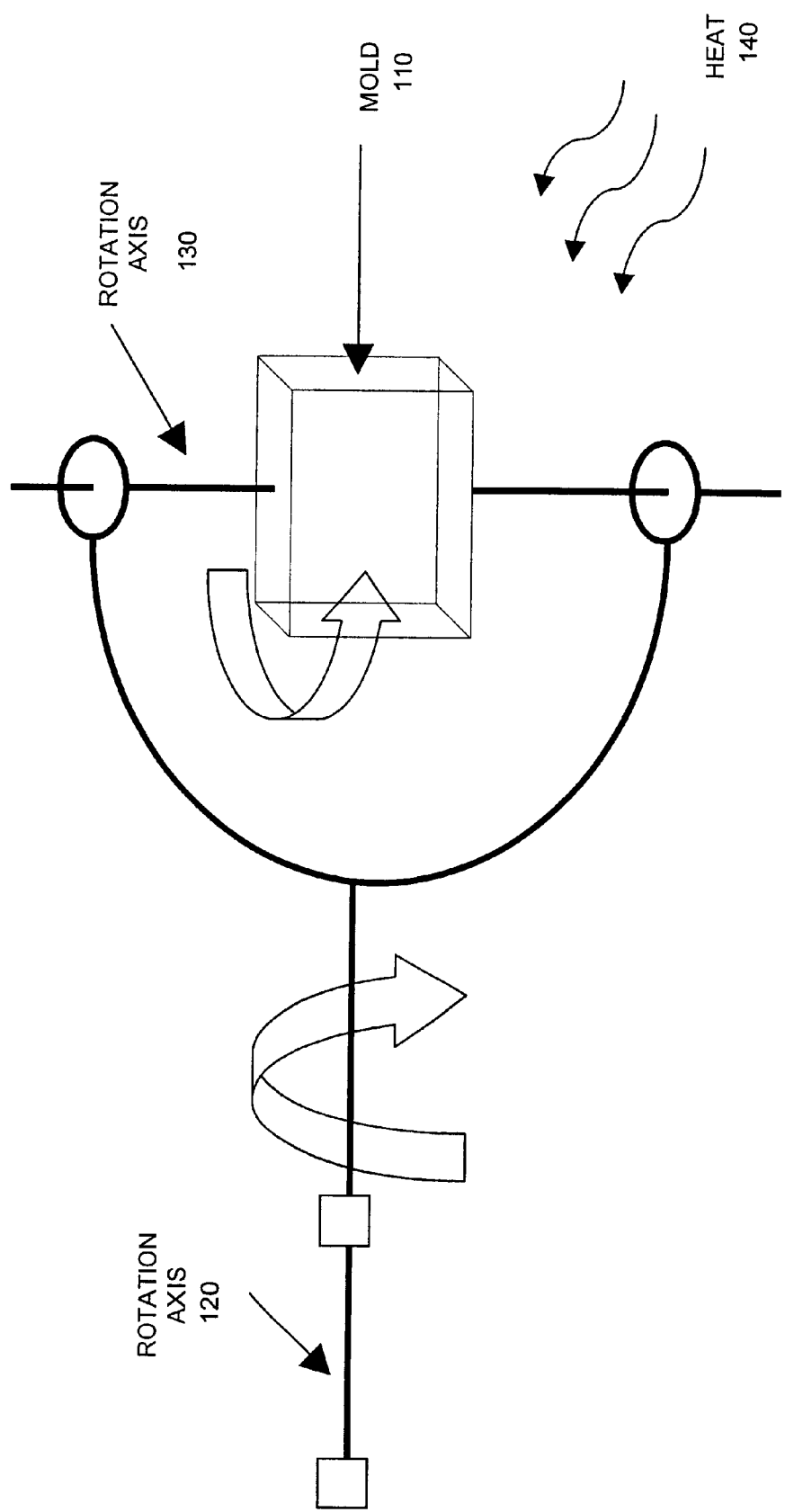
FIG. 1   ROTATIONAL MOLDING PROCESS

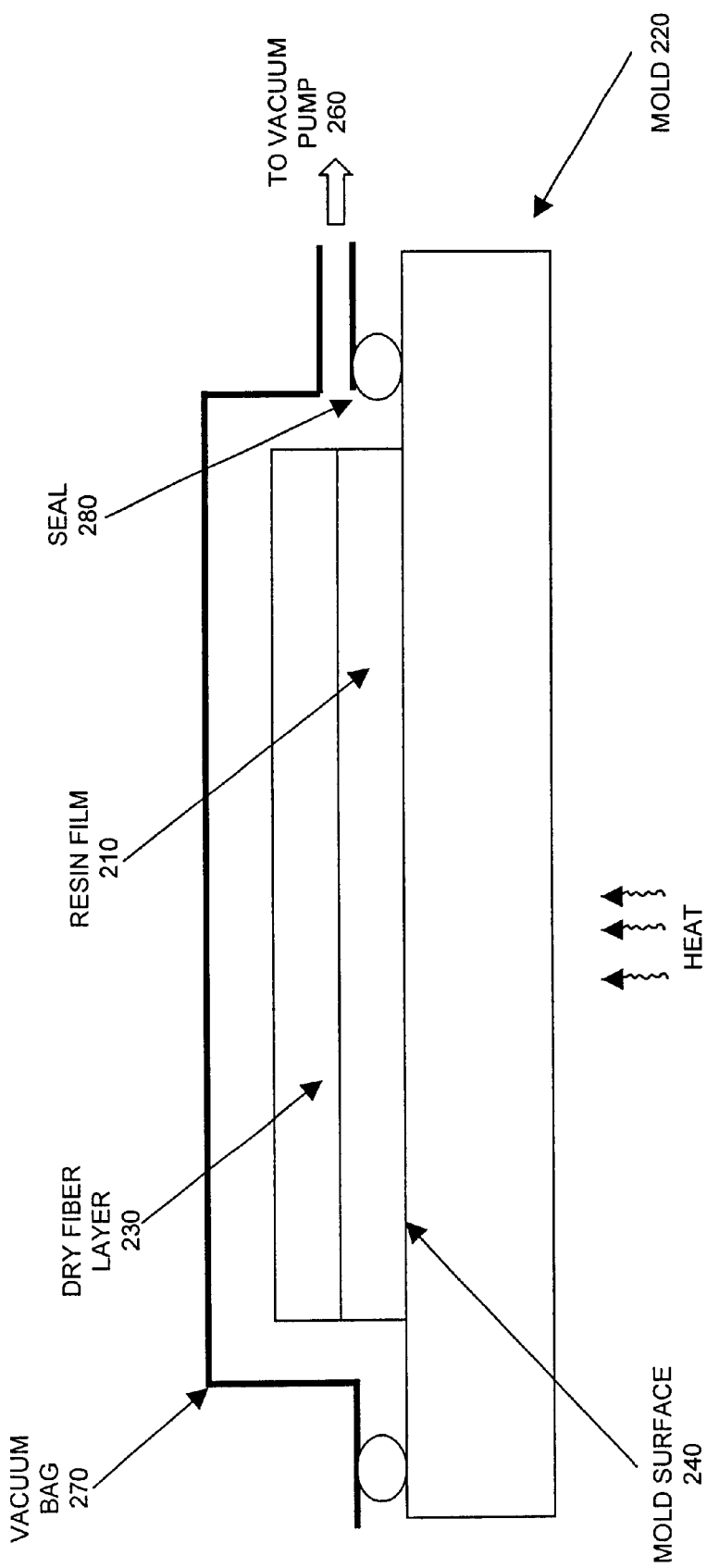
FIG. 2    RESIN FILM INFUSION PROCESS

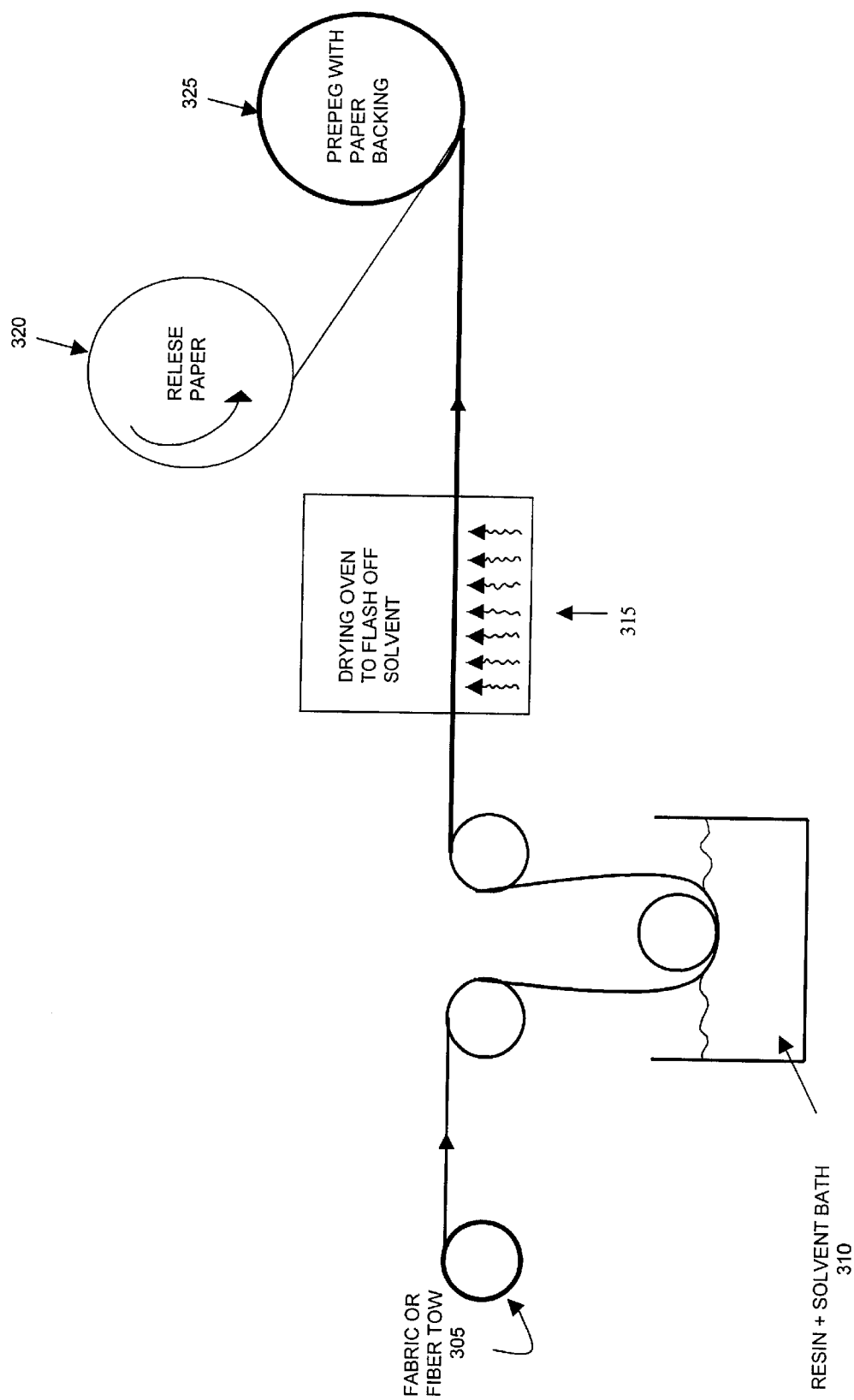
FIG. 3  SOLVENT PREPREG PROCESS

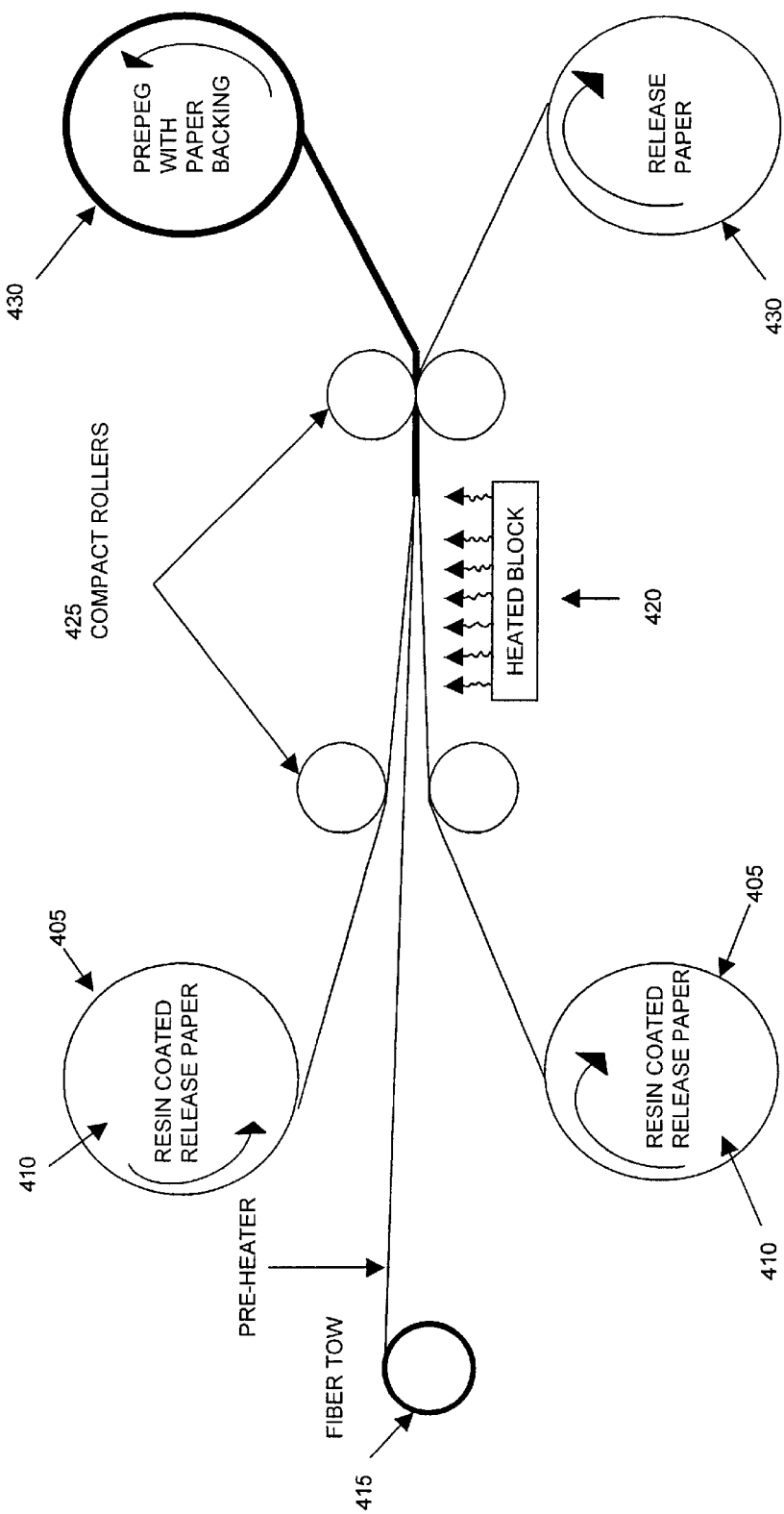
FIG. 4  HOT MELT PREPREG PROCESS

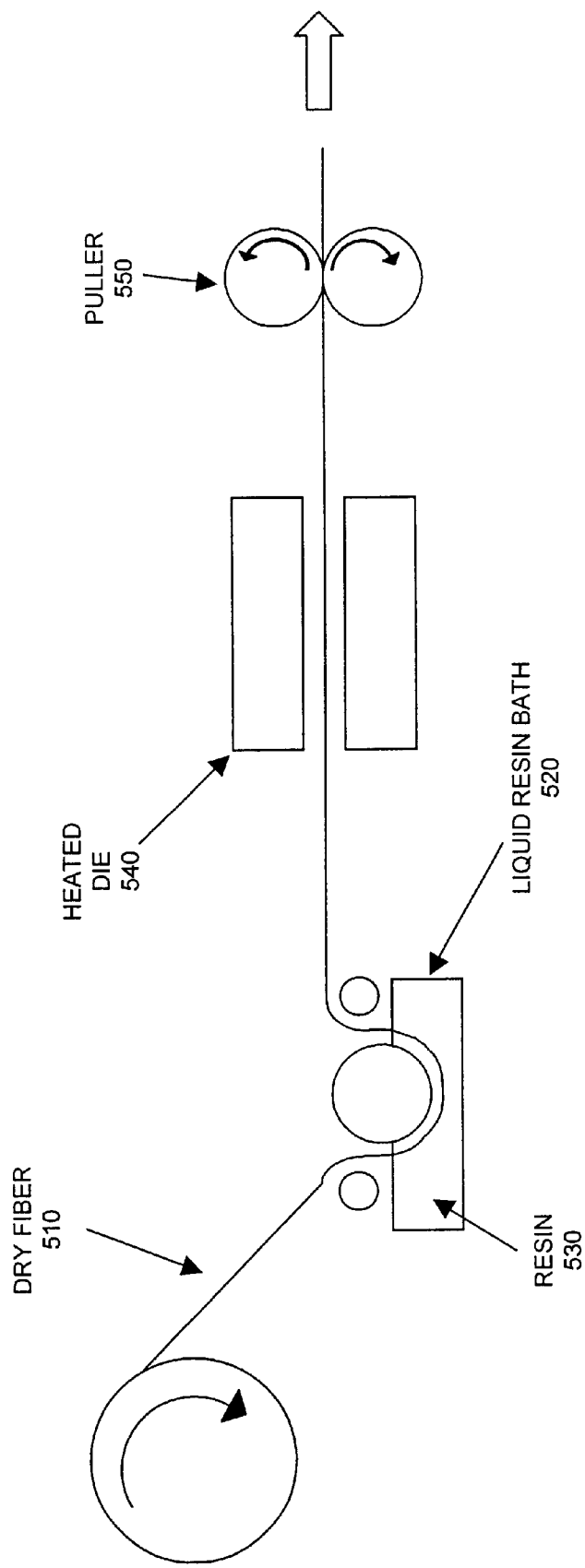
FIG. 5  PULTRUSION PROCESS

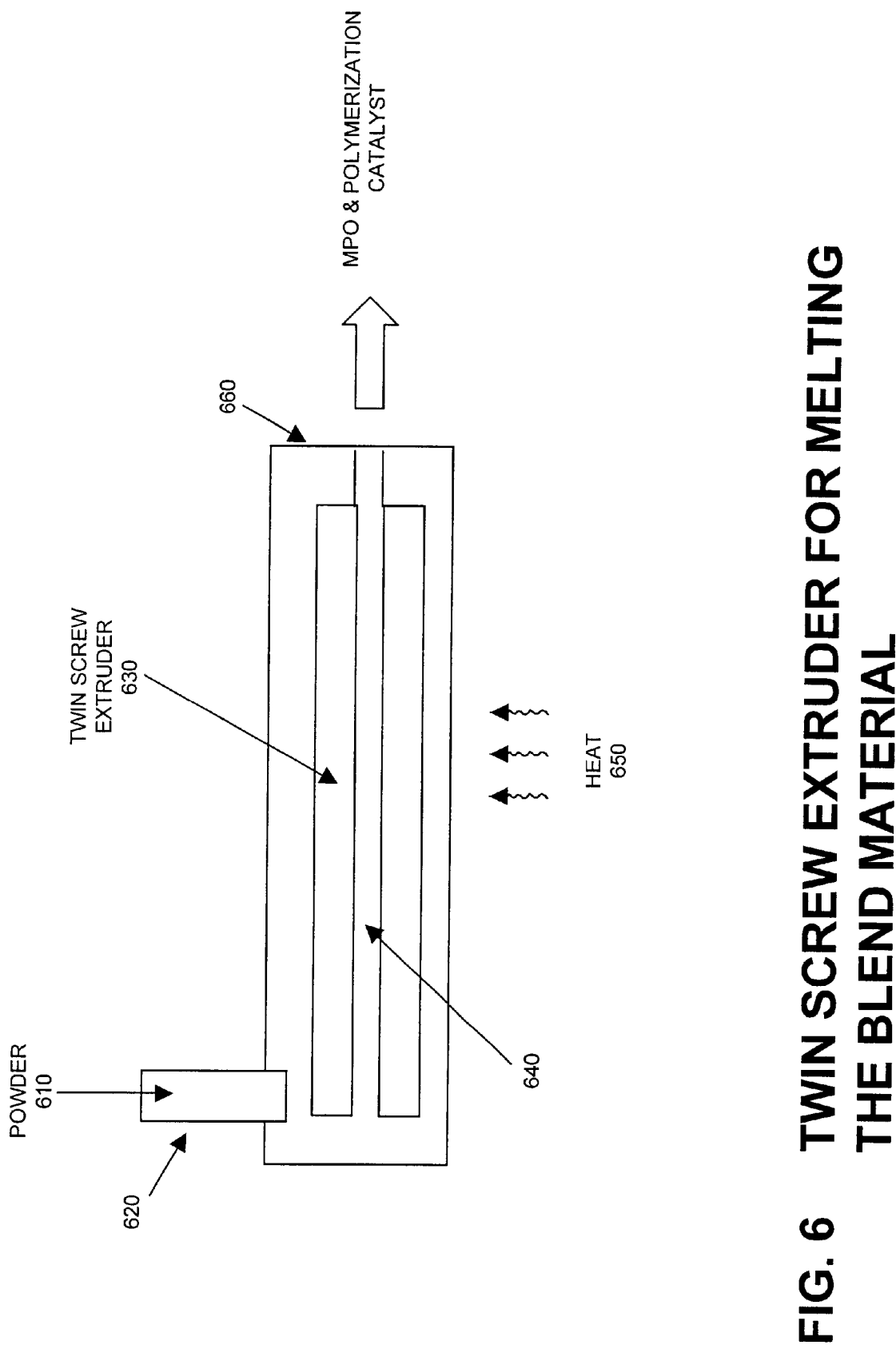
FIG. 6  TWIN SCREW EXTRUDER FOR MELTING THE BLEND MATERIAL

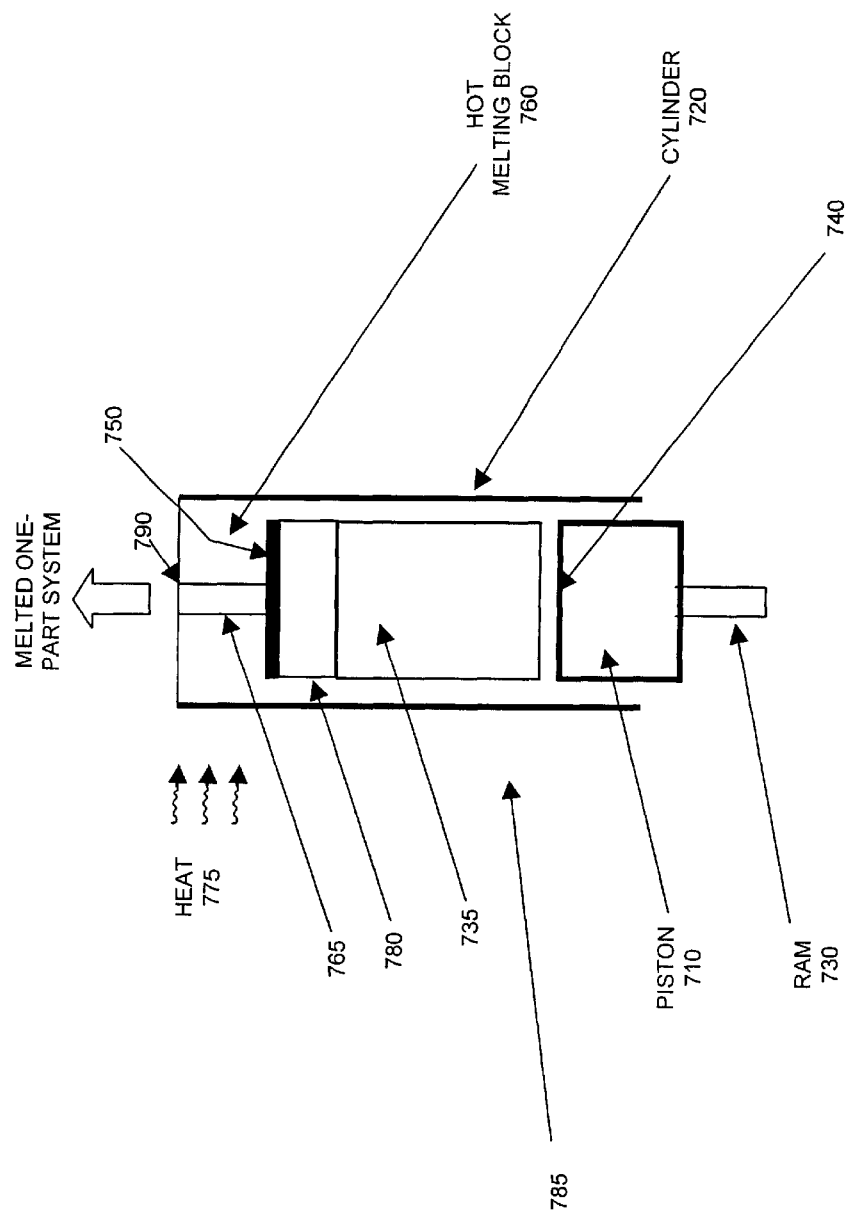
FIG. 7   PISTON TYPE MELTER FOR MELTING THE BLEND MATERIAL

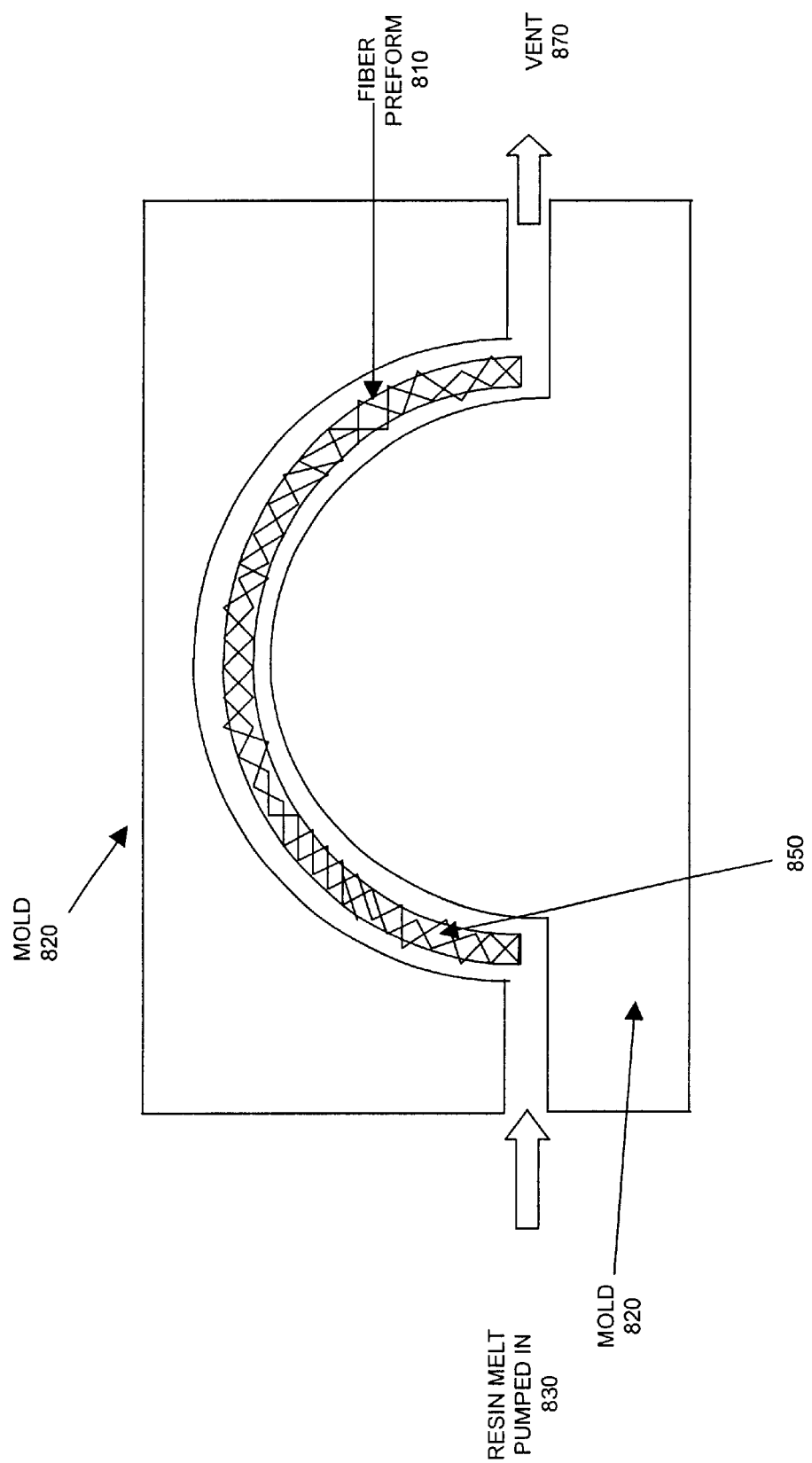
FIG. 8  RESIN TRANSFER MOLDING PROCESS

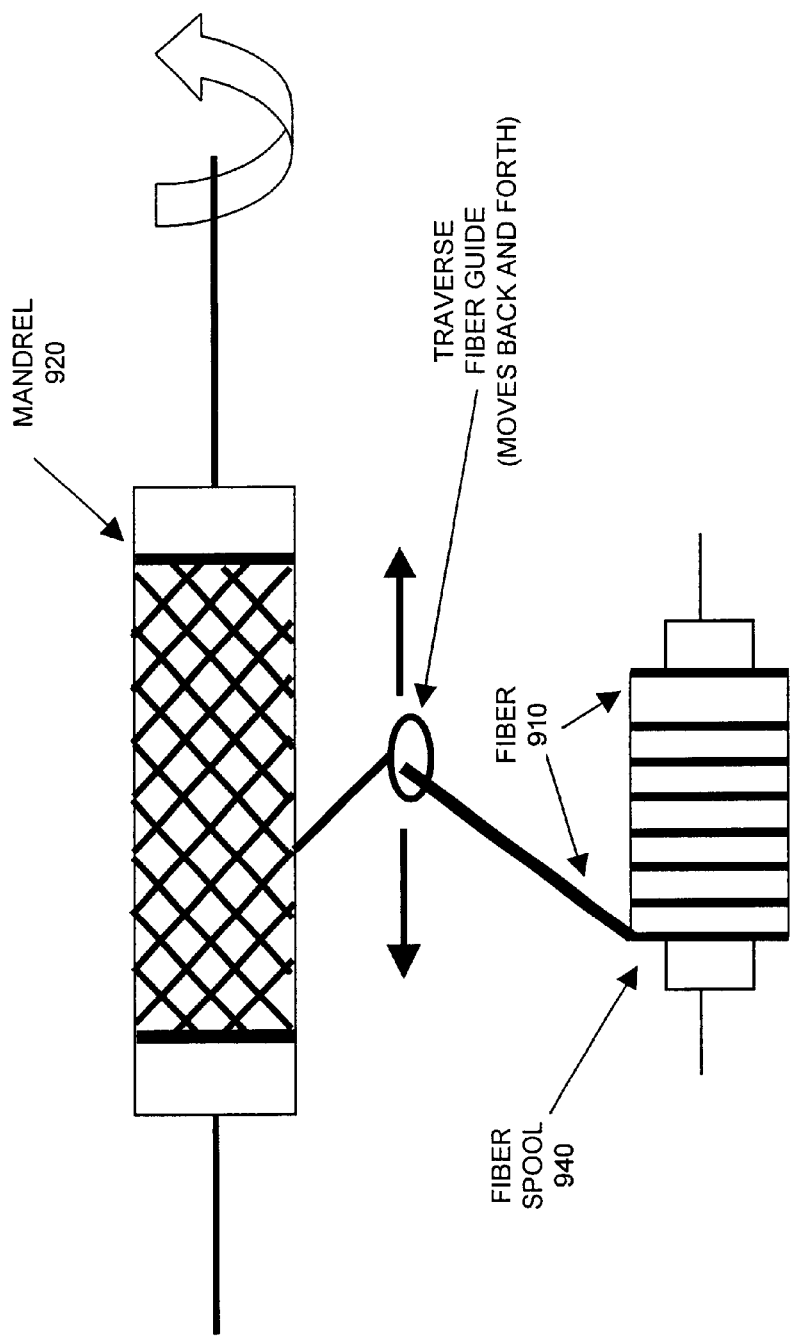
FIG. 9   FILAMENT WINDING PROCESS

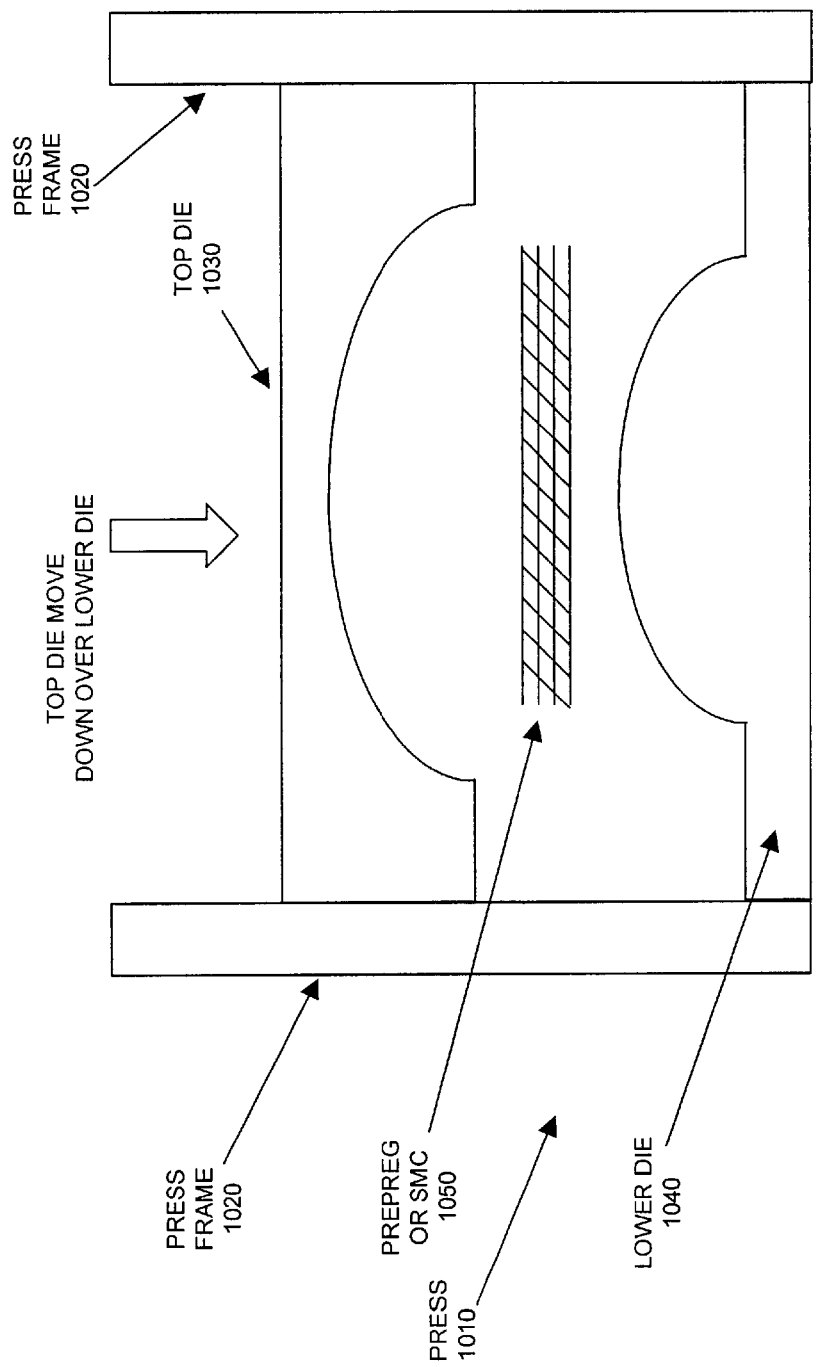
FIG. 10 COMPRESSION MOLDING PROCESS

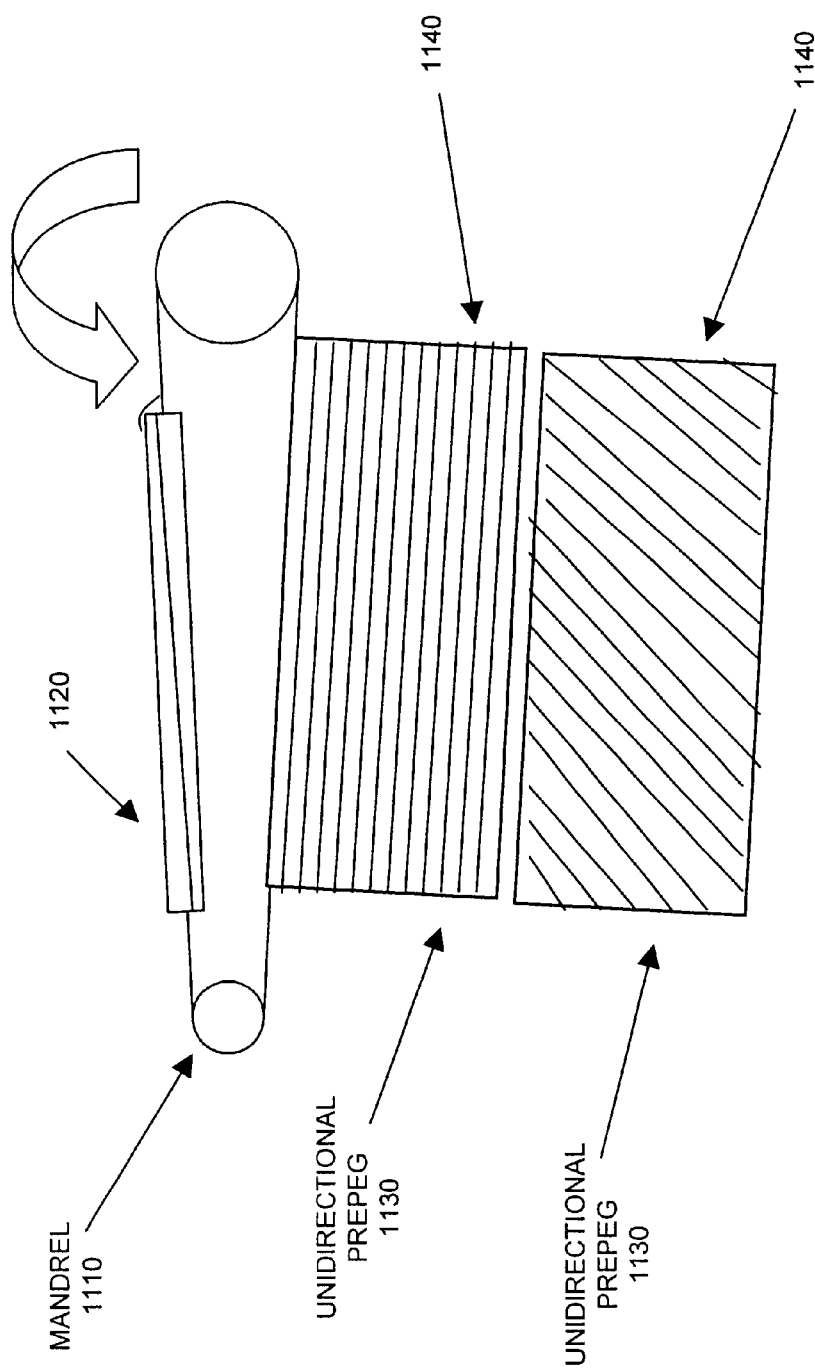
FIG. 11 ROLL WRAPPING PROCESS

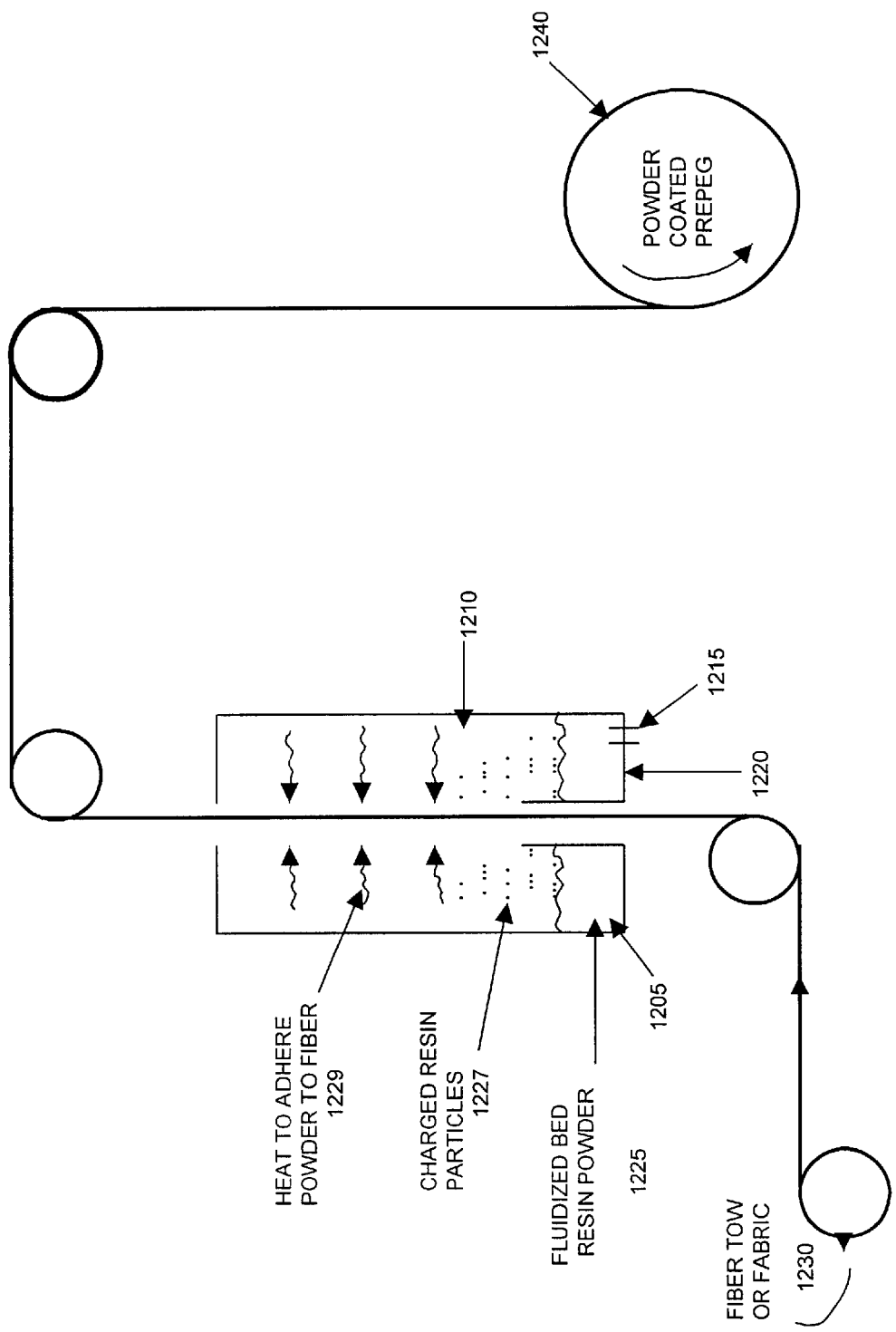
FIG. 12  POWDER COATING PROCESS

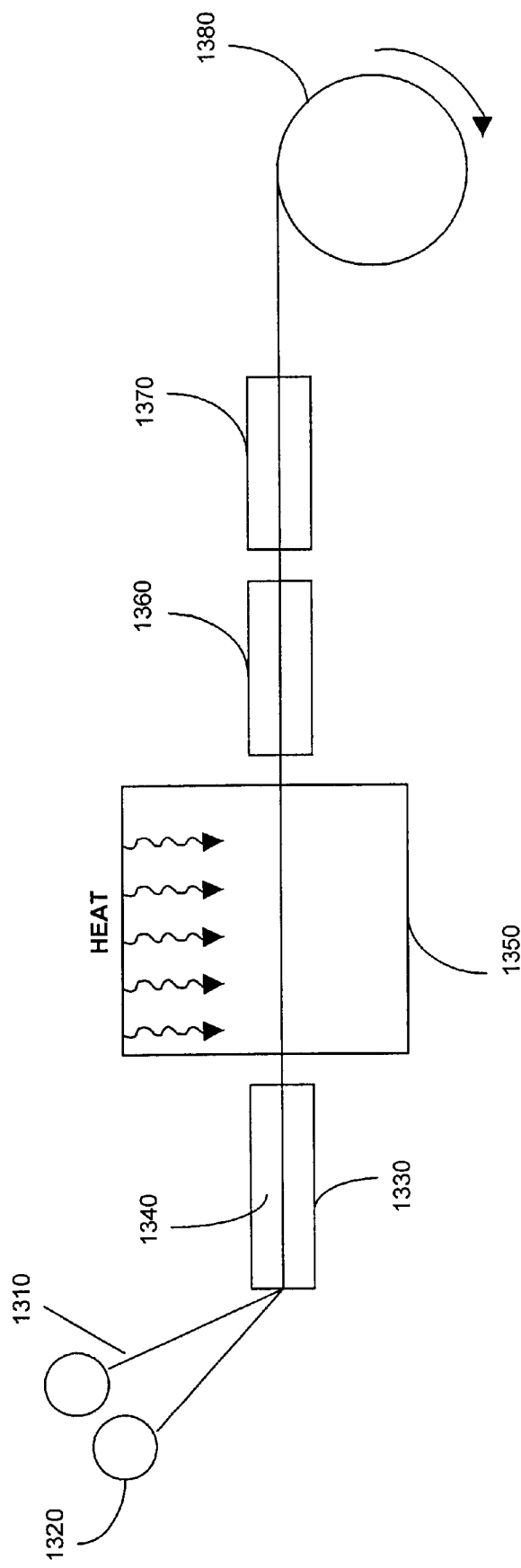
FIG. 13 WATER SLURRY PROCESS (A)

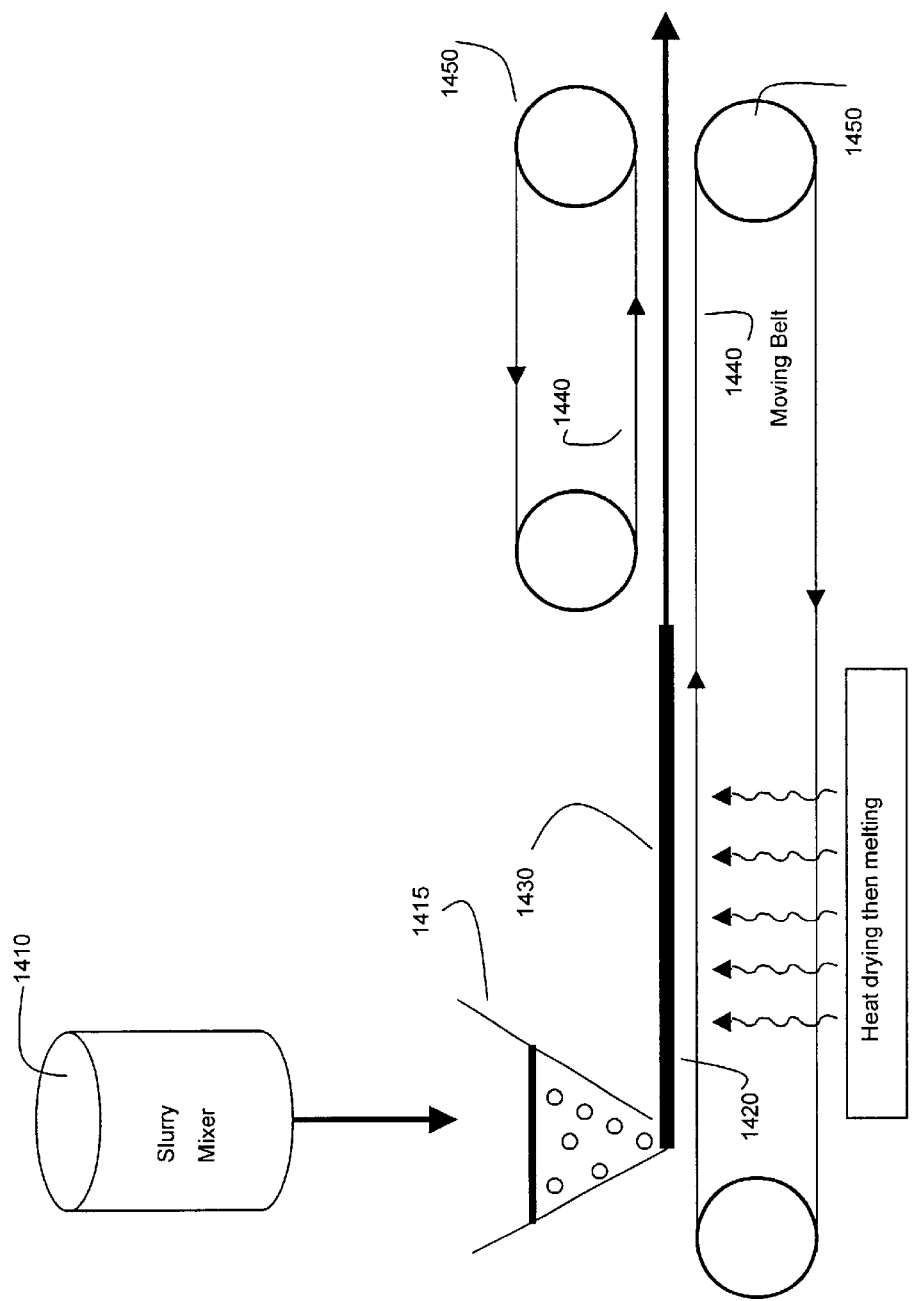
FIG. 14 WATER SLURRY PROCESS (B)

MACROCYCLIC POLYESTER OLIGOMERS AND PROCESSES FOR POLYMERIZING THE SAME

RELATED APPLICATIONS

This application is a continuation-in-part of U.S. Utility patent application Ser. No. 09/535,132 filed on Mar. 24, 2000. This application also claims the benefit of the filing date of U.S. Provisional Patent Application Ser. No. 60/177,727, filed on Jan. 21, 2000, entitled "Processing with Cyclic PBT to Produce Thermoplastic Compositions" by Winckler. The entirety of these applications is incorporated herein by reference.

TECHNICAL FIELD

This invention generally relates to thermoplastics and articles formed therefrom. More particularly, the invention relates to macrocyclic polyester oligomers and processes for polymerizing the same.

BACKGROUND INFORMATION

Linear polyesters such as poly(alkylene terephthalate) are generally known and commercially available where the alkylene typically has 2 to 8 carbon atoms. They have many valuable characteristics including strength, toughness, high gloss and solvent resistance. Linear polyesters are conventionally prepared by the reaction of a diol with a dicarboxylic acid or its functional derivative, typically a diacid halide or ester. Linear polyesters may be fabricated into articles of manufacture by a number of known techniques including extrusion, compression molding, and injection molding.

Recently, macrocyclic polyester oligomers were developed which have unique properties. These properties make them attractive as matrices for engineering thermoplastic composites. These desirable properties stem from the fact that macrocyclic polyester oligomers exhibit low melt viscosity, allowing them to impregnate a dense fibrous preform easily. Furthermore, certain macrocyclic polyester oligomers melt and polymerize at temperatures well below the melting point of the resulting polymer. Upon melting and in the presence of an appropriate catalyst, polymerization and crystallization can occur virtually isothermally. As a result, the time and expense required to thermally cycle a tool is favorably reduced.

Development of processing equipment for use with macrocyclic polyester oligomers has been limited. It is generally believed that production of molded parts from macrocyclic polyester oligomers requires existing equipment to be modified to allow for transfer of the macrocyclic polyester oligomers and polymerization catalysts into the equipment in the appropriate amounts at the appropriate time and at the appropriate temperature. Modifying existing equipment takes time and is often costly, and hence limits the application of macrocyclic polyester oligomers.

SUMMARY OF THE INVENTION

A blend of a macrocyclic polyester oligomer and a polymerization catalyst as a one component ready-to-use material with a long shelf life enables production of parts from macrocyclic polyester oligomers without the modification of existing equipment, thereby reducing time and cost of manufacture while expanding the application of macrocyclic polyester oligomers. In this blend material, the macrocyclic polyester oligomer remains intact in solid state at ambient conditions. Upon melting, the blend material initially forms a low viscosity fluid, and then rapidly polymerizes to form high molecular weight polyesters which subsequently solidify to form semi-crystalline polymers. In the case of certain macrocyclic polyester oligomers, for example, poly(1,4-butylene terephthalate), demolding can take place at the polymerization temperature, e.g., at about 180° C. to 200° C., because the resulting polyester polymer solidifies fairly rapidly at that temperature without cooling.

In one aspect, the invention generally features a blend material that includes a macrocyclic polyester oligomer, a polymerization catalyst, and optionally, a filler. In one embodiment, the macrocyclic polyester oligomer is substantially a homo- or co-polyester oligomer. Polymerization catalysts include, among others, tin compounds and titanate compounds.

In another aspect, the invention generally features a process for preparing a blend material as described above.

In yet another aspect, the invention features processes such as rotational molding, resin film infusion, pultrusion, resin transfer molding, filament winding, making and using powder coated or hot melt prepreg, compression molding, roll wrapping, and water slurry, which use the blend material described above. These processes of the invention may be used to form polyester polymer composites which may be included in articles of manufacture such as carbon fiber golf shafts or lightweight automotive chassis members.

In one aspect, a water slurry process is used to prepare a prepreg and to manufacture articles from macrocyclic polyester oligomers. In one embodiment, a process for preparing a water suspension of macrocyclic polyester oligomers includes the steps of contacting a macrocyclic polyester oligomer and a polymerization catalyst with water and a surfactant, and mixing the macrocyclic polyester oligomer and polymerization catalyst with water and the surfactant thereby forming a suspension. In another embodiment, a process for impregnating macrocyclic polyester oligomers for polymerization includes the steps of providing a suspension of a macrocyclic polyester oligomer and a polymerization catalyst in water, applying the suspension to a base material, drying to remove water from the suspension, and pressing the dried suspension to a desired form. In yet another embodiment, a composition of macrocyclic polyester oligomer includes a macrocyclic polyester oligomer, a polymerization catalyst, and water. In yet another embodiment, a process for polymerizing macrocyclic polyester oligomers includes the steps of mixing a blend material having a macrocyclic polyester oligomer and a polymerization catalyst with water to form a mixture, applying the mixture to a base material, drying to remove water, heating to polymerize the macrocyclic polyester oligomer, and pressing the polymerized macrocyclic polyester oligomer to a desired form.

Thus, heating may be applied such that, after drying the mixture, there is no polymerization, partial polymerization or complete polymerization of the macrocyclic polyester oligomer.

The foregoing and other objects, aspects, features, and advantages of the invention will become more apparent from the following figures, description, and claims.

BRIEF DESCRIPTION OF FIGURES

The drawings are not necessarily to scale, emphasis instead is generally placed upon illustrating the principles of the invention to facilitate its understanding.

FIG. 1 is a schematic illustration of an embodiment of the invention including a rotational molding process.

FIG. 2 is a schematic illustration of an embodiment of the invention including a resin film infusion process.

FIG. 3 is a schematic illustration of an embodiment of the invention including a solvent prepreg process.

FIG. 4 is a schematic illustration of an embodiment of the invention including a hot-melt prepreg process.

FIG. 5 is a schematic illustration of an embodiment of the invention including a pultrusion process.

FIG. 6 is a schematic illustration of an embodiment of the invention including an extruder.

FIG. 7 is a schematic illustration of an embodiment of the invention including a piston type continuous melter.

FIG. 8 is a schematic illustration of an embodiment of the invention including a resin transfer molding process.

FIG. 9 is a schematic illustration of an embodiment of the invention including a filament winding process.

FIG. 10 is a schematic illustration of an embodiment of the invention including a compression molding process.

FIG. 11 is a schematic illustration of an embodiment of the invention including a roll wrapping process.

FIG. 12 is a schematic illustration of an embodiment of the invention including a powder coating process.

FIG. 13 is a schematic illustration of an embodiment of the invention including a water slurry process.

FIG. 14 is a schematic illustration of another embodiment of the invention including a water slurry process.

DESCRIPTION

The present invention is directed to the surprising discovery that a blend material comprising a macrocyclic polyester oligomer and a polymerization catalyst provides superior processing characteristics relative to conventional thermoplastics precursors. Prior to this invention, it was not recognized that a mixture of a macrocyclic polyester oligomer and a polymerization catalyst can be stable and have a long shelf life. The blend material of the invention allows for easy production, storage, transportation and processing.

From the standpoint of applications, the blend material is one-component and is ready-to-use. The blend material may be used advantageously for manufacturing articles using processes such as injection and rotational molding, resin film infusion, resin transfer molding, filament winding, powder coating to create a prepreg or film, hot melt prepreg preparation, compression molding, roll wrapping, water slurry, and pultrusion with or in some cases without reinforcement. The blend material may also be processed like a thermoset while producing a thermoplastic product. Furthermore, the blend material eliminates the need to modify existing equipment to allow for transfer of the macrocyclic polyester oligomer and the polymerization catalyst into the equipment in the appropriate amounts at the appropriate time and at the appropriate temperature. Accordingly, this invention provides for ways to achieve greater production efficiency and lower manufacturing costs.

Definitions

The following general definitions may be helpful in understanding the various terms and expressions used in this specification.

As used herein, a "blend material" is understood to mean a mixture of two or more components including at least one macrocyclic polyester oligomer and at least one polymerization catalyst. Preferably the blend material is uniformly mixed. A blend material may also include a filler as well as other components recognized by a skilled artisan.

As used herein, "macrocyclic" is understood to mean a cyclic molecule having at least one ring within its molecular structure that contains 8 or more atoms covalently connected to form the ring.

As used herein, an "oligomer" is understood to mean a molecule that contains 2 or more identifiable structural repeat units of the same or different formula.

As used herein, a "macrocyclic polyester oligomer" is understood to mean a macrocyclic oligomer containing structural repeat units having an ester functionality. A macrocyclic polyester oligomer typically refers to multiple molecules of one specific formula. However, a macrocyclic polyester oligomer also may include multiple molecules of different formulae having varying numbers of the same or different structural repeat units. In addition, a macrocyclic polyester oligomer may be a co-polyester or multi-polyester oligomer, i.e., an oligomer having two or more different structural repeat units having an ester functionality within one cyclic molecule.

As used herein, "substantially homo- or co-polyester oligomer" is understood to mean a polyester oligomer wherein the structural repeat units are substantially identical or substantially two different structural repeat units, respectively.

As used herein, "an alkylene group" is understood to mean $-C_nH_{2n}-$, where $n \geq 2$.

As used herein, "a cycloalkylene group" is understood to mean a cyclic alkylene group, $-C_nH_{2n-x}-$, where x represents the number of H's replaced by cyclization(s).

As used herein, "a mono- or polyoxyalkylene group" is understood to mean $[-(CH_2)_m-O-]_n-(CH_2)_m-$, wherein m is an integer greater than 1 and n is an integer greater than 0.

As used herein, "a divalent aromatic group" is understood to mean an aromatic group with links to other parts of the macrocyclic molecule. For example, a divalent aromatic group may include a meta- or para-linked monocyclic aromatic group (e.g., benzene).

As used herein, "an alicyclic group" is understood to mean a non-aromatic hydrocarbon group containing a cyclic structure within.

As used herein, "a $C_{1-4}$ primary alkyl group" is understood to mean an alkyl group having 1 to 10 carbon atoms which includes straight chain or branched molecules.

As used herein, "a $C_{1-10}$ alkyl group" is understood to mean an alkyl group connected via a primary carbon atom.

As used herein, a "methylene group" is understood to mean $-CH_2-$.

As used herein, an "ethylene group" is understood to mean $-CH_2-CH_2-$.

As used herein, "a $C_{2-3}$ alkylene group" is understood to mean $-C_nH_{2n}-$, where n is 2 or 3.

As used herein, "a $C_{2-6}$ alkylene group" is understood to mean $-C_nH_{2n}-$, where n is 2–6.

As used herein, "substitute phenyl group" is understood to mean a phenyl group having one or more substituents. A substituted phenyl group may have substitution pattern that is recognized in the art. For example, a single substituent may be in the ortho, meta or para positions. For multiple substituents, typical substitution patterns include, for example, 2,6-, 2,4,6-, and, 3,5-substitution patterns.

As used herein, "a filler" is understood to mean a material other than a macrocyclic polyester oligomer or a polymerization catalyst that may be included in the blend material. A filler often is included to achieve a desired purpose or property, and may be present in the resulting polyester polymer. For example, the purpose of the filler may be to provide stability, such as chemical, thermal or light stability, to the blend material or the polyester polymer product, and/or to increase the strength of the polyester polymer product. A filler also may provide or reduce color, provide weight or bulk to achieve a particular density, provide flame resistance (i.e., be a flame retardant), be a substitute for a more expensive material, facilitate processing, and/or provide other desirable properties as recognized by a skilled artisan. Illustrative examples of fillers are, among others, fumed silica, titanium dioxide, calcium carbonate, chopped fibers, fly ash, glass microspheres, micro-balloons, crushed stone, nanoclay, linear polymers, and monomers.

As used herein, "a polyester polymer composite" is understood to mean a polyester polymer that is associated with another substrate such as, a fibrous or particulate material. Illustrative examples of particulate material are chopped fibers, glass microspheres, and crushed stone. Certain fillers thus can be used to prepare polyester polymer composites.

As used herein, a "fibrous substrate" is understood to mean more continuous substrate, e.g., fiberglass, ceramic fibers, carbon fibers or organic polymers such as aramid fibers.

I. Macrocyclic Polyester Oligomers

One of the ingredients of the blend material of the invention is a macrocyclic polyester oligomer. Many different macrocyclic polyester oligomers can readily be made and are useful in the practice of this invention. Thus, depending on the desired properties of the final polyester polymer product, the appropriate macrocyclic polyester oligomer(s) can be selected for use in its manufacture.

Macrocyclic polyester oligomers that may be employed in this invention include, but are not limited to, macrocyclic poly(alkylene dicarboxylate) oligomers having a structural repeat unit of the formula:

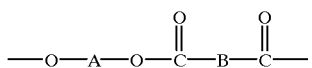

where A is an alkylene, or a cycloalkylene or a mono- or polyoxyalkylene group; and B is a divalent aromatic or alicyclic group.

Preferred macrocyclic polyester oligomers are macrocyclic poly(1,4-butylene terephthalate) (PBT), poly(1,3-propylene terephthalate) (PPT), poly(1,4-cyclohexylenedimethylene terephthalate) (PCT), poly(ethylene terephthalate) (PET), and poly(1,2-ethylene 2,6-naphthalenedicarboxylate) (PEN) oligomers, and copolyester oligomers comprising two or more of the above monomer repeat units.

Macrocyclic polyester oligomers may be prepared by lmown methods. Synthesis of the preferred macrocyclic polyester oligomers may include the step of contacting at least one diol of the formula HO—A—OH with at least one diacid chloride of the formula:

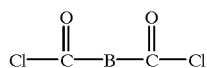

where A and B are as defined above. The reaction typically is conducted in the presence of at least one amine that has substantially no steric hindrance around the basic nitrogen atom. An illustrative example of such amines is 1,4-diazabicyclo[2.2.2]octane (DABCO). The reaction usually is conducted under substantially anhydrous conditions in a substantially water immiscible organic solvent such as methylene chloride. The temperature of the reaction typically is between about −25° C. and about 25° C. See, e.g., U.S. Pat. No. 5,039,783 to Brunelle et al.

Macrocyclic polyester oligomers have also been prepared via the condensation of a diacid chloride with at least one bis(hydroxyalkyl) ester such as bis(4-hydroxybutyl) terephthalate in the presence of a highly unhindered amine or a mixture thereof with at least one other tertiary amine such as triethylamine, in a substantially inert organic solvent such as methylene chloride, chlorobenzene, or a mixture thereof. See, e.g., U.S. Pat. No. 5,231,161 to Brunelle et al.

Another method for preparing macrocyclic polyester oligomers or macrocyclic copolyester oligomers is to depolymerize linear polyester polymers in the presence of an organotin or titanate compound. In this method, linear polyesters are converted to macrocyclic polyester oligomers by heating a mixture of linear polyesters, an organic solvent, and a transesterification catalyst such as a tin or titanium compound. The solvents used, such as o-xylene and o-dichlorobenzene, usually are substantially free of oxygen and water. See, e.g., U.S. Pat. No. 5,407,984 to Brunelle et al. and U.S. Pat. No. 5,668,186 to Brunelle et al.

It is also within the scope of the invention to employ macrocyclic homo- and co-polyester oligomers to produce homo- and co-polyester polymers, respectively. Therefore, unless otherwise stated, an embodiment of a composition, article, or process that refers to a macrocyclic polyester oligomer also includes co-polyester embodiments.

II. Polymerization Catalysts

The other primary ingredient of the blend material of the invention is a polymerization catalyst. The polymerization catalysts that may be employed in the invention are capable of catalyzing the polymerization of the macrocyclic polyester oligomer. As with state-of-the-art processes for polymerizing macrocyclic polyester oligomers, organotin and organotitanate compounds are the preferred catalysts, although other catalysts may be used. For example, organotin compound 1,1,6,6-tetra-n-butyl-1,6-distanna-2,5,7,10-tetraoxacyclodecane may be used as polymerization catalyst. Other illustrative organotin compounds include n-butyltin(IV) chloride dihydroxide, dialkyltin(IV) oxides, such as di-n-butyltin(IV) oxide and di-n-octyltin oxide, and acyclic and cyclic monoalkyltin (IV) derivatives such as n-butyltin tri-n-butoxide, dialkyltin(IV) dialkoxides such as di-n-butyltin(IV) di-n-butoxide and 2,2-di-n-butyl-2-stanna-1,3-dioxacycloheptane, and trialkyltin alkoxides such as tributyltin ethoxide. See, e.g., U.S. Pat. No. 5,348,985 to Pearce et al.

Also, trisstannoxanes having the general formula (I) shown below can be used as a polymerization catalyst to produce branched polyester polymers.

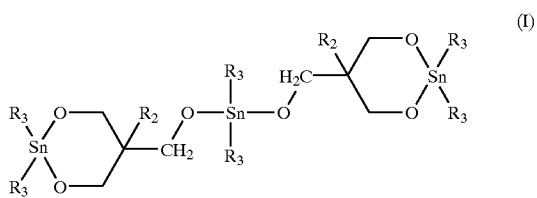

where $R_2$ is a $C_{1-4}$ primary alkyl group and $R_3$ is $C_{1-10}$ alkyl group.

Additionally, organotin compounds with the general formula (II) shown below can be used as a polymerization catalyst to prepare branched polyester polymers from macrocyclic polyester oligomers.

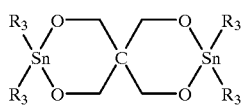

where $R_3$ is defined as above.

As for titanate compounds, tetra(2-ethylhexyl) titanate, tetraisopropyl titanate, tetrabutyl titanate, and titanate compounds with the general formula (III) shown below can be used as polymerization catalysts.

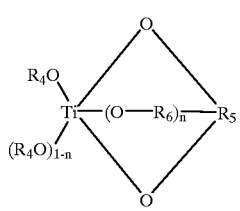

wherein: each $R_4$ is independently an alkyl group, or the two $R_4$ groups taken together form a divalent aliphatic hydrocarbon group; $R_5$ is a $C_{2-10}$ divalent or trivalent aliphatic hydrocarbon group; $R_6$ is a methylene or ethylene group; and n is 0 or 1.

Examples of titanate compounds with the above general formula are shown in Table 1.

TABLE 1

Examples of Titanate Compounds Having Formula (III)

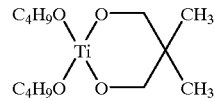

Di-1-butyl 2,2-dimethylpropane-
1,3-dioxytitanate

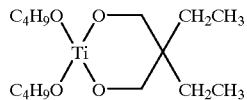

Di-1-butyl 2,2-diethylpropane-
1,3-dioxytitanate

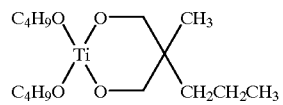

Di-1-butyl 2(1-propyl)-2-
methylpropane-1,3-dioxytitanate

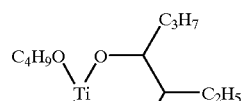

Di-1-butyl 2-ethylhexane-
1,3-dioxytitanate

TABLE 1-continued

Examples of Titanate Compounds Having Formula (III)

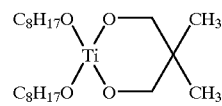

Di(2-ethyl-1-hexyl) 2,2-dimethylpropane-
1,3-dioxytitanate

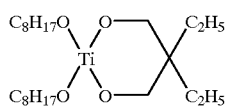

Di(2-ethyl-1-hexyl) 2,2-diethylpropane-
1,3-dioxytitanate

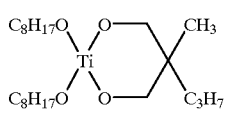

Di(2-ethyl-1-hexyl) 2-(1-propyl)-2-
methylpropane-1,3-dioxytitanate

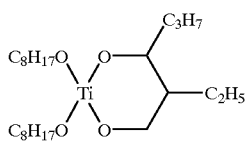

Di(2-ethyl-1-hexyl) 2-ethylhexane-
1,3-dioxytitanate

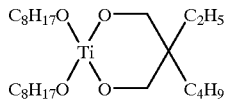

Di(2-ethyl-1-hexyl) 2-(1-butyl)-2-
ethylpropane-1,3-dioxytitanate

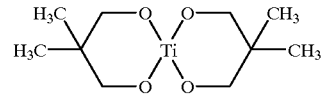

Bis(2,2-dimethyl-1,3-propylene) titanate

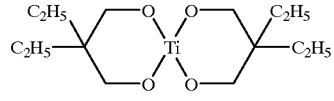

Bis(2,2-diethyl-1,3-propylene) titanate

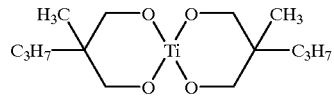

Bis(2-(1-propyl)-2-methyl-1,3-propylene) titanate

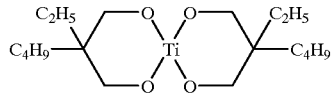

Bis(2-(1-butyl)-2-ethyl-1,3-propylene) titanate

TABLE 1-continued

Examples of Titanate Compounds Having Formula (III)

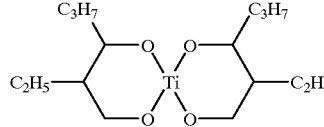

Bis(2-ethyl-1,3-hexylene) titanate

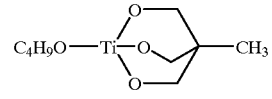

1-(1-Butoxy)-4-methyl-2,6,7-trioxa-
1-titanabicyclo[2,2,2]octane

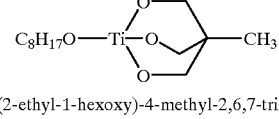

1-(2-ethyl-1-hexoxy)-4-methyl-2,6,7-trioxa-
1-titanabicyclo[2,2,2]octane

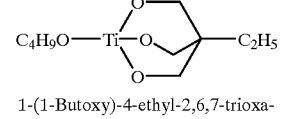

1-(1-Butoxy)-4-ethyl-2,6,7-trioxa-
1-titanabicyclo[2,2,2]octane

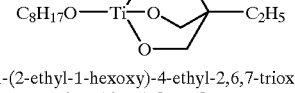

1-(2-ethyl-1-hexoxy)-4-ethyl-2,6,7-trioxa-
1-titanabicyclo[2,2,2]octane

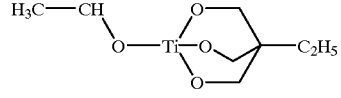

1-(2-Propoxy)-4-ethyl-2,6,7-trioxa-
1-titanabicyclo[2,2,2]octane

Titanate ester compounds having at least one moiety of the following general formula have also been used as polymerization catalysts:

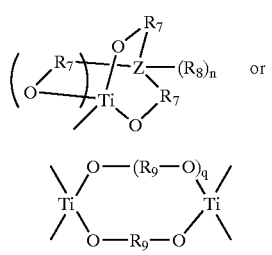

wherein:

each $R_7$ is independently a $C_{2\text{-}3}$ alkylene group;

$R_8$ is a $C_{1\text{-}6}$ alkyl group or unsubstituted or substituted phenyl group;

Z is O or N; provided when Z is O, m=n=0, and when Z is N, m=0 or 1 and m+n=1;

each $R_9$ is independently a $C_{2\text{-}6}$ alkylene group; and q is 0 or 1.

Typical examples of such titanate compounds are shown below as formula (VI) and formula (VII):

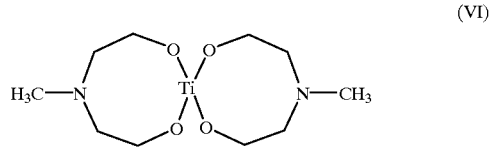

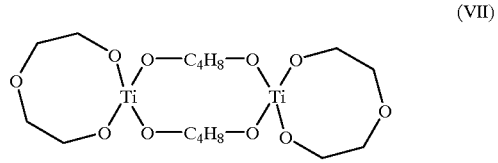

III. The Blend Material

This invention provides a blend material and processes for preparing the blend material which includes a macrocyclic polyester oligomer and a polymerization catalyst. The blend material allows for easy production, storage, transportation and processing. From the standpoint of applications, the blend material is a one-component ready-to-use mixture. The blend material may also be processed like a thermoset while producing a thermoplastic. Furthermore, the blend material eliminates the need that existing equipment be modified to allow for transfer of the macrocyclic polyester oligomer and a polymerization catalyst into the equipment in the appropriate amounts at the appropriate time and at the appropriate temperature.

There is no limitation with respect to the physical form of the macrocyclic polyester oligomer when mixed with the polymerization catalyst as long as the macrocyclic polyester oligomer remains substantially chemically intact. In one embodiment, the macrocyclic polyester oligomer is a solid such as a powder. In this embodiment, mechanical mixing typically is used to mix the macrocyclic polyester oligomer with a polymerization catalyst. In another embodiment, the macrocyclic polyester oligomer is mixed in the presence of a solvent with the solvent remaining present during the step of mixing.

In one embodiment, the blend material also includes a filler. Illustrative examples of such fillers include pigments, light weight fillers, flame retardants, and ultraviolet light stabilizers. For example, calcium carbonate may be used to increase the thickness of a polyester polymer product to improve its mechanical performance. Also, glass microspheres may be added to lower the density of the product. Other fillers include nanoclays, e.g., to increase the modulus of the product, organo bromides in combination with antimonium oxides, e.g., to impart flame resistance, and colorants such as carbon black or titanium dioxide. Fillers thus can be used to prepare polyester polymer composites.

The filler is added generally between about 0.1% and 70% by weight, between about 25% and 70% by weight, or between about 2% and 5% by weight depending on the filler and the purpose for adding the filler. For example, the percentage is preferably between 25% and 50% by weight in the case of calcium carbonate, between 2% and 5% by weight in the case of nanoclays, between 0.1% and 1% in the case of pigments, and between 25% and 70% by weight in the case of glass microspheres.

A process for preparing the blend material includes providing a macrocyclic polyester oligomer and mixing the macrocyclic polyester oligomer with a polymerization catalyst. When preparing the blend, the macrocyclic polyester oligomer and the polymerization catalyst may be mixed together by various means. For example, any conventional mixer or blender may be employed to mix the macrocyclic polyester oligomer with the polymerization catalyst via agitation at temperatures below the melting temperature of the macrocyclic polyester oligomer. This process may be conducted under an inert atmosphere such as a nitrogen atmosphere.

A solvent may also be employed to assist in the uniform mixing of the macrocyclic polyester oligomer with the polymerization catalyst. Various solvents can be used, and there is no limitation with respect to the type of solvent that may be used other than that the solvent is substantially free of water. Illustrative examples of solvents that may be employed in the invention include methanol, ethanol, isopropanol, acetone, methyl ethyl ketone, benzene, toluene, o-xylene, chlorobenzene, dichloromethane, and chloroform.

There is no limitation with respect to the amount of solvent to be employed other than that the amount results in a uniform mixing of the macrocyclic polyester oligomer and the polymerization catalyst. In one embodiment, the blend of macrocyclic polyester oligomer with the polymerization catalyst is isolated either by direct removal of the solvent via evaporation or by precipitation via addition of the mixture into a nonsolvent. In another embodiment, the blend of solid ingredients is further dried under vacuum at elevated temperatures below the melting temperature and the polymerization temperature of the macrocyclic polyester oligomer to remove any residual solvent.

A process for preparing the blend material further having at least one filler, or any other additional material, is generally the same as described above, however, the characteristics of the filler and/or additional materials must be considered. It should be understood that the macrocyclic polyester oligomer, the polymerization catalyst, the filler, any additional material(s) and/or solvent, if used, may be mixed in any order or simultaneously as long as the final composition contains the appropriate amount of each ingredient.

It is within the scope of the invention to employ one, two or more different fillers in preparing a blend material of macrocyclic polyester oligomer and polymerization catalyst. Unless specifically stated otherwise, any embodiment of a composition, article or process that refers to filler in singular also includes an embodiment wherein two or more different fillers are employed. Similarly, unless stated otherwise, any embodiment of a composition, article or process that refers to fillers in plural also includes an embodiment wherein one filler is employed.

In one embodiment of the invention, the amount of polymerization catalyst employed is generally about 0.01 to about 10.0 mole percent, preferably about 0.1 to about 2 mole percent, and more preferably about 0.2 to about 0.6 mole percent based on total moles of monomer repeat units of the macrocyclic polyester oligomer.

Although dependent on the particular composition of the blend material, blend materials typically exhibit a shelf life generally longer than a week, and preferably longer than a month, and more preferably longer than a year when stored at ambient temperature.

It is within the scope of the invention to employ one, two or more different polymerization catalysts in preparing a blend of macrocyclic polyester oligomer and polymerization catalyst. Unless specifically stated otherwise, any embodiment of a composition, article or process that refers to polymerization catalyst in singular also includes an embodiment wherein two or more different polymerization catalysts are employed. Similarly, unless stated otherwise, any embodiment of a composition, article or process that refers to polymerization catalyst in plural also includes an embodiment wherein one polymerization catalyst is employed. Two or more polymerization catalysts may be used to vary the rate of polymerization and to produce polyesters with variable degrees of branching.

IV. Polyermizing Macrocyclic Polyester Oligomers

In some aspects of the invention, various processes are employed to polymerize a macrocyclic polyester oligomer. For many of these processes, the unique properties of the macrocyclic polyester oligomers make it possible to use these processes advantageously. Generally, it was not previously contemplated that the use of macrocyclic polyester oligomers with these processes would in any way be advantageous.

It is not necessary that a blend material as described above is employed in these processes, however, depending on the application, use of a blend material may be advantageous. It is contemplated that for processes in which a macrocyclic polyester oligomer and a catalyst are provided, it is possible to provide them separately. For example, a macrocylic polyester oligomer and a catalyst can be added to a reaction vessel at different times, or via different mechanisms. As another example, a mixture of the macrocyclic polyester oligomer and a catalyst can be made as they are added to a reaction vessel. It is also contemplated that the blend material can be used to provide a macrocyclic polyester oligomer and to provide a catalyst.

In one embodiment, a process for preparing a high molecular weight polyester polymer includes providing a blend material having a macrocyclic polyester oligomer and a polymerization catalyst, and polymerizing the macrocyclic polyester oligomer. The blend material may include a filler. The filler may also be added prior to, during, or after the polymerization process. Any reaction vessel may be employed that is substantially inert to the ingredients of the blend material.

Generally, the reaction vessel is charged with the blend material. Preferably, the macrocyclic polyester oligomer is polymerized by heating the macrocyclic polyester oligomer to an elevated temperature. Often the macrocyclic polyester oligomer is heated to above its melting point so it becomes less viscous and can be manipulated easier in processing. Subsequently, the temperature may be maintained or increased to initiate and complete the polymerization reaction. In one embodiment, heat is supplied to melt the blend material at about 130° C. to about 250° C., preferably about 160° C. to about 220° C., and more preferably about 180° C. to about 190° C. to initiate and complete polymerization. Stirring may be employed under an inert atmosphere in order to enhance polymerization of the macrocyclic polyester oligomer to produce the desired polyester polymer. In one embodiment, the polymerization is conducted under air atmosphere. In another embodiment, the polymerization is conducted under inert atmosphere.

Examples of polyesters produced by the processes of the invention include poly(ethylene terephthalate), poly(1,3-propylene terephthalate), poly(1,4-butylene terephthalate), poly(1,4-cyclohexylenedimethylene terephthalate), poly(1, 2-ethylene 2,6-naphthalenedicarboxylate) and copolyesters comprising two or more of the above monomer repeat units.

In one aspect of the invention, articles are produced using the blend material (with or without fillers) via injection and rotational molding, resin film infusion, resin transfer molding, filament winding, powder coating to create a prepreg or film, hot melt prepreg preparation, compression molding, roll wrapping, water slurry, and pultrusion with or in some cases without reinforcement. The only proviso is that conditions allow for the polymerization of the blend to form high molecular weight polyester upon heating. Generally, most of such processes require that the resin to be processed have a low melt viscosity; therefore, conventional thermoplastic resins that have high melt viscosity are not suitable for processing. However, macrocyclic polyester oligomers have low melt viscosity.

Also, in processing conventional thermoplastic resins with such processes, the cooling of the mold after processing is required to solidify the melt. Demolding can occur only after such a cooling step. This results in longer processing time and increased energy usage. However, macrocyclic poly(1,4-butylene terephthalate) oligomers, for instance, polymerize at a temperature, from about 180° C. to about 200° C., that is lower than the melting point of the resulting polyester polymer which is about 220° C. In addition, poly(1,4-butylene terephthalate) has a favorable crystallization rate even at such temperatures. Thus, the resulting polyester polymer crystallizes without cooling the mold allowing polymerization and demolding to occur at the same temperature thereby reducing processing time and energy consumption.

In applying macrocyclic polyester oligomers to the processes described below, a fast crystallization of the resulting polyester polymer may be desirable. Depending on the nature of the macrocyclic polyester oligomers, the nature of the resulting polymer, and the polymerization process employed, fast crystallization may need to be induced by cooling the mold wherein the polymerization process occurred. For instance, in general, high molecular weight poly(1,4-butylene terephthalate) crystallizes fairly rapidly even at 180° C. to 200° C. while, in general, poly(ethylene terephthalate) requires cooling from such temperatures to achieve a favorable crystallization rate. In cases where the polyester polymers have a melting point higher than the polymerization temperature but does not crystallize at a favorable rate, agents, such as nucleating agents, which facilitate crystallization may be employed. In cases where the polyester polymers have a melting point lower than the polymerization temperature, cooling is needed to bring about crystallization of the resulting polyester polymer.

In one embodiment of each of the following processes involving a polymerization of a macrocyclic polyester oligomer, no cycling (i.e., cooling and heating) the tools (e.g., the mold and/or other equipment) after polymerization is complete, is conducted. In another embodiment of each of the following processes involving a polymerization of a macrocyclic polyester oligomer, some cooling is conducted.

The following general definitions may be helpful in understanding the various terms and expressions used in this specification and particularly in the processes described below. "Wet-out" means a process to cause a physical state of good and sustained contact between a liquid substrate and a solid substrate such that no substantial amount of air or other gas is trapped between the liquid substrate and the solid substrate. "Fiber" means any material with slender, elongated structure such as polymer or natural fibers. The material can be fiberglass, ceramic fibers, carbon fibers or organic polymers such as aramid fibers. Fibers may also be grouped to form a "tow" or "strand". A "tow" or "strand" is a group of fibers together, or a bundle of fibers, which are usually wound onto spools and may or may not be twisted. These tows or strands can be woven or knitted to form fabrics. A "tackifier" or "binder" is resin or glue used in small amounts to lightly hold fibers together. A "fiber preform" is an assembly of fiber tows and/or fabric held together in a desired shape. Generally, fiber preform fibers are dry and may be held together with various tackifiers. A "prepreg" is a fiber material such as carbon fiber, glass fiber, or other fiber, that has been impregnated with a resin material in sufficient volume as to provide the matrix of the composite, and such that the ratio of fiber to resin is closely controlled. The fiber configuration can be in tow form, woven or knitted into a fabric, or in a unidirectional tape. The stickiness that allows multiple uncured layers to stick to one another during assembly is known as "tack". The ability of a layer of material to be formed to a complex shape before it is processed is known as "drape".

a. Rotational Molding

Referring to FIG. 1, rotational molding is a process for making hollow thermoplastic articles, such as a wide variety of articles including fluid storage tanks, tractor fenders and large children's toys. In one aspect of the invention, rotational molding is used to manufacture articles from a macrocyclic polyester oligomer. Typically, the process begins by placing a macrocyclic polyester oligomer and a polymerization catalyst in a mold 110. After closing the mold 110, the mold is rotated about two axes 120, 130 simultaneously so that the contents roll over the intended areas of the inside of the mold. Heat 140 is applied to melt the macrocyclic polyester oligomer and the polymerization catalyst. After the macrocyclic polyester oligomer and the polymerization catalyst are melted, the rotation continues until the content polymerizes and solidifies. The part is demolded while the tools are hot or after some cooling of the tools. The process can then be repeated with the same equipment to produce another thermoplastic part. The rotation rates about the axes are often controlled so that the orientation of the mold takes a long time to repeat. This provides a uniform coverage inside the mold. Heat can be applied in the form of external gas flames, but internal electrical mold heating can also be used. One type of mold is made of aluminum with a wall thickness of ¼ of an inch. Fiber reinforced plastic can be used as well.

In one embodiment of the invention, a process for polymerizing a macrocyclic polyester oligomer includes providing a macrocyclic polyester oligomer, providing a polymerization catalyst (or in the case of a blend material, providing a blend material having a macrocyclic polyester oligomer and a polymerization catalyst), loading the macrocyclic polyester oligomer and the polymerization catalyst (or in the case of a blend material, loading the blend material) into a mold having a chamber, rotating the mold along at least one axis, and heating the mold or otherwise to cause polymerization. In one embodiment, the process also includes the step of removing the resulting polymer while the resulting polymer is at substantially the same temperature of the polymerization and the resulting polymer solidifies into a solid at the polymerization temperature.

In one embodiment, the macrocyclic polyester oligomer and the polymerization catalyst (or the blend material) is fed into a cool mold. In another embodiment, the macrocyclic polyester oligomer and the polymerization catalyst (or the blend material) is fed into a hot mold with the temperature of the mold being substantially the same as the polymerization temperature. In one embodiment, the mold is not cooled before the start of the next processing round. In another embodiment, the mold temperature is cooled before the next round of processing. In one embodiment, the mold is rotated along one axis. In another embodiment, the mold is rotated along two or more axes.

In one embodiment, the macrocyclic polyester oligomer processed by rotational molding is a macrocyclic PBT oligomer. A macrocyclic PBT oligomer has a melting point at about 180° C., which is much lower than the melting point of polymerized PBT, which is about 220° C. As a result, the polymerized PBT solidifies and can be removed from the mold at approximately the temperature at which polymerization is conducted.

In another embodiment, the macrocyclic polyester oligomers are macrocyclic PBT/PET co-oligomers. Macrocyclic PBT/PET co-oligomers have a melting point at about 180° C., which is much lower than that of the polymerized PBT/PET. Polymerized PBT/PET melts at about 220° C. to 240° C. depending on the PBT/PET ratio. As a result, the polymerized PBT/PET crystallizes and can be removed from the mold at the temperature at which polymerization is conducted.

In one embodiment, a filler is placed into the mold in which it is mixed with the macrocyclic polyester oligomer and the polymerization catalyst. In another embodiment, a filler is mixed with the macrocyclic polyester oligomer and the polymerization catalyst before being placed in the mold. In yet another embodiment, a filler is part of the blend material.

b. Resin Film Infusion

Referring to FIG. 2, resin film infusion is a process for making plastic composite articles that are predominantly flat on one face and may have detailed features. An illustrative example of such articles is aircraft wing skins which are typically constructed of a composite made with carbon fiber and epoxy resin. In one aspect of the invention, resin film infusion is used to manufacture articles from macrocyclic polyester oligomers. A layer or film 210 of a macrocyclic polyester oligomer containing a polymerization catalyst is placed in a mold 220 that has a layer of dry fiber 230. The macrocyclic polyester oligomer layer or film 210 is placed between the layer of dry fiber 230 and the mold surface 240. The mold 220 is then heated to melt the macrocyclic polyester oligomer layer or film 210, which then infuses into the dry fiber layer 230, usually under a force created by a vacuum 260 on the other side of the dry fiber layer 230. A vacuum bag 270 may be used together with a seal 280 maintained between the vacuum bag 270 and the mold surface 240. After the completion of polymerization, the part is either demolded hot or after some cooling of the tools.

In one embodiment, a process for polymerizing a macrocyclic polyester oligomer includes providing a macrocyclic polyester oligomer, providing a polymerization catalyst (or, in the case of a blend material, providing a blend material having a macrocyclic polyester oligomer and a polymerization catalyst), loading the macrocyclic polyester oligomer and the polymerization catalyst (or in the case of a blend material, loading the blend material) into a mold having a dry layer of fibrous material to form a layer between the dry layer of fibrous material and a surface of the mold, heating the mold to melt the macrocyclic polyester oligomer, forcing the macrocyclic polyester oligomer and the polymerization catalyst to infuse into the dry layer of fibrous material, and heating the mold or otherwise to cause polymerization of the macrocyclic polyester oligomer. In another embodiment, the infusion process is facilitated, for example, by a pressure generated from a vacuum bag. The resin layer could also be between the vacuum bag and the fiber layer. The resin layer does not have to go against the mold. Because the resin film of the macrocyclic polyester oligomer melts to a low viscosity liquid, infusion into a fiber is easily accomplished. In one embodiment, the process also includes the step of removing the resulting polymer while the resulting polymer is at substantially the same temperature of the polymerization and the resulting polymer solidifies into a solid at the polymerization temperature. In one embodiment, no cooling of the mold is conducted before demolding or before the start of the next round of processing with the mold. In another embodiment, some cooling of the mold is conducted before demolding or the start of the next round of processing.

In another embodiment, a filler is placed into the mold in which it is mixed with the macrocyclic polyester oligomer and the polymerization catalyst. In another embodiment, a filler is mixed with the macrocyclic polyester oligomer and the polymerization catalyst before being placed in the mold. In yet another embodiment, a filler is part of the blend material.

In one embodiment, a macrocyclic PBT oligomer is polymerized using the resin film infusion processes described here.

In one embodiment, a macrocyclic polyester oligomer powder prepreg is used instead of the fabric and resin layers. A powder prepreg in this case is a base material, usually fibrous, that has been impregnated with macrocyclic polyester oligomers in powder form before they are placed in the mold. In another embodiment, a prepreg, described in the next section, is used in a resin film infusion process. A prepreg may be a unidirectional prepreg whereon the impregnated content is distributed along one direction.

Typically with resin film infusion processes, if the resin is a thermoset, additional heat is typically needed to solidify the resin before demolding. If the resin is a conventional thermoplastic, the material generally must be cooled to re-solidify the resin before demolding can take place. The high viscosity of melted conventional thermoplastic materials and poor infusion characteristics have, in the past, made resin film infusion processes suitable almost exclusively to thermoset. As just described, macrocyclic polyester oligomers can be processed using a resin film infusion process to produce a thermoplastic.

C. Prepreg Processes

In one embodiment, a unidirectional prepreg is in the form of unidirectional prepreg tape which includes a sheet of fibers. The sheet of fibers is held in the sheet form because the fibers are impregnated with macrocyclic polyester oligomers that hold them together. Two primary methods are used to make unidirectional prepregs from macrocyclic polyester oligomers, solvent impregnation and hot melt.

Referring to FIG. 3, a solvent impregnation method is implemented by running fabric or fiber tow 305 through a solvent bath 310 containing a macrocyclic polyester oligomer and a polymerization catalyst. The concentration of macrocyclic polyester oligomer is typically 30% by weight. The solvent is used to reduce the viscosity, which allows easy wet-out of the fabric or fiber tow 305. The fabric or fiber tow 305, wetted with the macrocyclic polyester oligomer, the polymerization catalyst, and the solvent, is then transported to drying oven 315 wherein the solvent is flashed off. The macrocyclic polyester oligomer and the polymerization catalyst remain on the fabric or fiber tow 305. The fabric or fiber tow 305 may be heated at temperatures and for an amount of time that allows some or all of the solvent to flash off in order to control tack. The amount of tack reduces as more solvent is flashed off. Then, the paper sheet 320 is rolled together with the fabric or fiber tow 305 to form a prepreg with paper backing 325, completing the prepreg process.

In one embodiment, a process for impregnating a macrocyclic polyester oligomer and a polymerization catalyst to form a prepreg includes the steps of dissolving a macrocyclic polyester oligomer and a polymerization catalyst (or in the case of a blend material, dissolving a blend material having a macrocyclic polyester oligomer and a polymerization catalyst) in a solvent to form a solution, contacting the solution with a fibrous base material, and removing the solvent. In another embodiment, the solvent is removed by heat. In one embodiment, the fibrous base material is a fiber tow. In another embodiment, a release paper backing is provided and placed adjacent the macrocyclic polyester oligomer and the polymerization catalyst.

In one embodiment, a macrocyclic polyester oligomer is incorporated into a unidirectional prepreg using a solvent process. In one embodiment, a process for impregnating a macrocyclic polyester oligomer includes dissolving a macrocyclic polyester oligomer and a polymerization catalyst (or in the case of a blend material, dissolving a blend material having a macrocyclic polyester oligomer and a polymerization catalyst), combining the solution with a filler to form a mixture, applying the mixture to a base material, and removing the solvent.

Referring to FIG. 4, a hot-melt method starts with a release paper 405 that has been coated with a layer of a macrocyclic polyester oligomer and a polymerization catalyst to a specific thickness. The release paper 405 having the coating thereon is stored on a roll 410. When combined with a fiber tow 415 that has been preheated, the macrocyclic polyester oligomer and the polymerization catalyst on the release paper 405 is brought into contact with the fiber tow 415 and is heated by a heating block 420 to reduce viscosity of the coating. Compaction rollers 425 drive the fiber tow 415 into the macrocyclic polyester oligomer coating layer forming a prepreg with a paper backing which is then rolled onto roller 430.

In one embodiment, a process for impregnating a macrocyclic polyester oligomer and a polymerization catalyst to form a prepreg includes the steps of providing a release base material having thereon a macrocyclic polyester oligomer and a polymerization catalyst (or in the case of a blend material, providing a release base material having thereon a blend material having a macrocyclic polyester oligomer and a polymerization catalyst) and pressing the release base material against a fibrous material under heat. In one embodiment, a filler is also impregnated with the macrocyclic polyester oligomer and the polymerization catalyst. In one embodiment, the filler is part of a blend material to be impregnated. In one embodiment, the prepreg is made with tack. A macrocyclic polyester oligomer containing appropriate amount of a polymerization catalyst is thinly spread on non-stick substrate surface and melted with instant heating. The molten macrocyclic polyester oligomer is then rapidly cooled to quench from crystallization, resulting in a soft pliable film that can be removed from the substrate surface. Macrocyclic polyester oligomers made with tack are used in many applications that are generally for thermosetting resins. Macrocyclic polyester oligomers with tack are processed like a thermoset while producing a thermoplastic product.

A unidirectional prepreg tape of conventional thermoplastic does not have tack or drape at room temperature, it must be heated when formed, and is difficult to use. Thermally quenched non-crystalline macrocyclic polyester oligomers are soft and sticky at ambient temperature. Illustrative examples of such macrocyclic polyester oligomers are macrocyclic poly(1,4-butylene terephthalate) (PBT), poly(1,4-cyclohexylenedimethylene terephthalate) (PCT), poly(ethylene terephthalate) (PET), and poly(1,2-ethylene 2,6-naphthalendicarboxylate) (PEN) oligomers and copolyester oligomers comprising two or more of the above monomer repeat units. Such macrocyclic polyester oligomers are used in the creation of a thermoplastic prepreg with tack and drape.

In one embodiment, a macrocyclic PBT oligomer and a polymerization catalyst is impregnated by the processes described here.

d. Pultrusion

Referring to FIG. 5, pultrusion is a process for making fiber reinforced plastic composite parts and components with a constant linear cross-section such as rods, tubes and bars stock, whereby fiber reinforcements are combined with a resin material and pulled through a heated die. The fiber-reinforced composite parts exit the die in the desired shape. In one aspect of the invention, pultrusion processes are used to manufacture articles from macrocyclic polyester oligomers. A dry fiber tow or fabric 510 is first pulled by puller 550 through the liquid resin bath 520 to apply the macrocyclic polyester oligomer and the polymerization catalyst 530, and then is pulled by a puller 550 into the heated die 540 to polymerize the macrocyclic polyester oligomer, and to form the desired shape and to solidify. The viscosity of the liquid resin is relatively low, approximately 100's of centipoise at room temperature, and easily wets and impregnates the fiber material.

Variations of the above process include pumping the macrocyclic polyester oligomer and the polymerization catalyst into the die to completely eliminate the liquid resin bath. This process is sometimes called "Continuous Resin Transfer Molding" (CRTM). As to the fiber, it can be carbon, glass, aramid, or other fibrous materials.

In one embodiment of the invention, a pultrusion process is used to polymerize macrocyclic polyester oligomers for the manufacture of a variety of articles. Such a process includes providing a macrocyclic polyester oligomer, providing a polymerization catalyst (or in the case of a blend material, providing a blend material having a macrocyclic polyester oligomer and a polymerization catalyst), pulling a fibrous strand into an elongated die, moving the macrocyclic polyester oligomer and the polymerization catalyst (or in the case of a blend material, moving the blend material) into the die thereby causing contact with and around the fibrous strand, heating to cause polymerization of the macrocyclic polyester oligomer forming high molecular weight polyester resin matrix around the fibrous strand, and pulling the polyester matrix into an exit portion of the die having a desired cross section thereby forming a rigid article. When the die is not heated to the melting point of the resulting polyester resin matrix and the crystallization rate of the resulting polymer is favorable at the polymerization temperature, no cooling is necessary to allow the solidification of the polyester resin matrix. In one embodiment, no cooling of the tools is conducted. In another embodiment, some cooling is conducted. In one embodiment, a blend material is injected directly into the pultrusion die. In one embodiment, a powder impregnation process, such as electrostatic powder coating, is used to combine the blend material with fiber strands prior to its introduction into the pultrusion die. In one embodiment, the process of combining the blend material and fiber strands is done off-line before pultrusion, and wound onto spools. In another embodiment, combination is done inline in place of the resin bath.

In another embodiment, the blend material in powder form is fed directly into the pultrusion die having a melting and impregnation zone. In another embodiment, the blend material is continuously melted outside the die, and pumped into the die in liquid form. In one embodiment, macrocyclic PBT oligomer is polymerized using the pultrusion processes described here.

Referring to FIG. 6, in one embodiment, macrocyclic polyester oligomers are used in a pultrusion process wherein the blend material is continuously melted outside the die and pumped into the die in liquid form. The blend material powder 610 is fed into hopper 620. An extruder 630 which has a barrel chamber with a rotating worm screw forces the powder into a heated zone 640 which is typically heated by an electricity, steam or oil system 650. The melted blend material exits the end of the extruder 660 and enters the pultrusion die. This process may also be adopted to employ a macrocyclic polyester oligomer and a polymerization catalyst not in the form of a blend material.

Referring to FIG. 7, in another embodiment of the invention, the blend material is continuously melted outside the die and pumped into the die in liquid form. A piston 710 is placed inside cool cylinder 720 and is connected to and driven by a ram 730. The blend material 735 is placed inside the cool cylinder between the front surface 740 of the piston 710 and the back surface 750 of the hot melting block 760. A hole in the melting block 765 allows the blend material to be pushed through the melting block 760. The hot melting block is typically heated by an electricity, steam or oil heating system 775. As the piston is pushed up, the blend material becomes melted as it comes into contact with the melting block 760, forms a melted region 780, and travels through a hole 765 in the melting block, out the exit from the melting head 790 and into the mold or pultrusion die. This process may also be adopted to employ a macrocyclic polyester oligomer and a polymerization catalyst not in the form of a blend material.

Generally, it is difficult to use conventional thermoplastic resins in the above processes because conventional thermoplastic resins are difficult to process due to their high melt viscosity. Macrocyclic polyester oligomers, however, melt to a low viscosity liquid. Low viscosity makes it easy to wet out fibers, like thermoset resins. Macrocyclic polyester oligomers can polymerize to high molecular weight thermoplastics. An additional advantage of using PBT-based macrocyclic polyester oligomers is that they will melt, wet out a fiber, polymerize, and crystallize or solidify all at a constant temperature, in the range of about 180° C. to about 200° C. This reduces and even eliminates the need to cool the exit end of the pultrusion die, allowing the shortening of the die and/or the increase of the pull speed.

e. Resin Transfer Molding

Referring to FIG. 8, resin transfer molding is a process for making plastic composite articles in a variety of shapes and sizes, often with a smooth surface finish and requiring little or no additional trimming or machining, such as automotive body panels and chassis components, bicycle forks, and tennis rackets. In one aspect of the invention, resin transfer molding processes are used to manufacture articles from macrocyclic polyester oligomers. Generally, resin transfer molding begins with a fiber preform 810 that is close to the final shape of the part. The preform 810 is placed in a mold 820 of the desired final shape, and the mold is closed. A mixture of macrocyclic polyester oligomer and a polymerization catalyst is melted to a melt 830 that is then pumped in. The melt wets out the fiber preform 810 and fills any remaining volume 850. Once the resulting polyester thermoplastic polymer solidifies the part is demolded. Depending on the nature of the macrocyclic polyester oligomers, the nature of the resulting polyester polymer, and the polymerization process, a cooling step may or may not be needed to bring about crystallization.

The melt 830 is usually injected slowly so that it wicks into the fiber of the fiber preform 810. Vacuum applied to the vent 870 before and during processing can help eliminate trapped air. The vent 870 can also be sealed and the mold pressurized with resin to eliminate voids. Also, the mold can be heated to maintain the low viscosity of the resin and to effect polymerization. Resin transfer molding processes described here may be used to manufacture articles from macrocyclic polyester oligomers.

In one embodiment of the invention, a process for polymerizing a macrocyclic polyester oligomer includes providing a macrocyclic polyester oligomer, providing a polymerization catalyst (or in the case of a blend material, providing a blend material having a macrocyclic polyester oligomer and a polymerization catalyst), loading the macrocyclic polyester oligomer and the polymerization catalyst (or loading the blend material) into the mold having the fibrous preform therein, heating the mold to melt the macrocyclic polyester oligomer, forcing the macrocyclic polyester oligomer and the polymerization catalyst into the fibrous preform, and heating the mold to cause polymerization of the macrocyclic polyester oligomer. In one embodiment, the process also includes the step of removing the resulting polymer while the resulting polymer is at substantially the same temperature of the polymerization and the resulting polymer solidifies into a solid at the polymerization temperature. In one embodiment, no cooling of the mold is conducted before demolding or before the start of the next round of processing with the mold. In another embodiment, some cooling of the mold is conducted before demolding or the start of the next round of processing. In one embodiment, a macrocyclic PBT oligomer is polymerized using the resin film infusion processes described here. In another embodiment, no fibrous preform is used. Resin transfer molding can be done without a preform. Such a process is referred to as casting.

In another embodiment, a filler is placed into the mold in which it is mixed with the macrocyclic polyester oligomer and the polymerization catalyst. In another embodiment, a filler is mixed with the macrocyclic polyester oligomer and the polymerization catalyst before being placed in the mold. In yet another embodiment, a filler is part of the blend material as described above.

Because macrocyclic polyester oligomers melt to a low viscosity liquid, infusion into fibers is easily accomplished. After polymerization is complete, the part is demolded with or without cooling depending on the macrocyclic polyester oligomer employed, the nature of the resulting polyester polymer, and the polymerization process. Furthermore, resin transfer molding generally uses only thermosetting resins, such as epoxy, unsaturated polyester, and phenolic resins. In one embodiment, thermoplastic articles are manufactured from macrocyclic polyester oligomers using the resin transfer molding processes.

f. Filament Winding

Referring to FIG. 9, filament winding is a process for making plastic composite parts that are hollow and require high strength and light weight such as tubes, compressed air tanks, fluid storage tanks, and automotive drive shafts. In one aspect of the invention, filament winding processes are used to manufacture articles from macrocyclic polyester oligomers. Generally, the process involves the winding of fibers 910 onto a mandrel 920. One embodiment for loading a macrocyclic polyester oligomer and a polymerization catalyst is to simply brush them onto the mandrel 920 and wind the fibers 910 as the mandrel 920 rotates. Another embodiment is to use a resin bath, such as a dip tank or rollers, to impregnate the fibers 910 somewhere between the fiber spool 940 and the mandrel 920. Another embodiment is using a prepreg fiber tow with the macrocyclic polyester oligomer and the polymerization catalyst in the tow to begin with. In another embodiment, the fibers are wound dry, followed by vacuum infusing with resin.

A macrocyclic polyester oligomers and a polymerization catalyst can be used in the form of a prepreg. Flat fiber bundle impregnated with a macrocyclic polyester oligomer and a polymerization catalyst is applied with heat and pressure at the location where the tape first touches the part. In one embodiment, the part is cool, and only the local vicinity around the tape contact is heated. A roller is typically used to apply the pressure to press the tape into the part and consolidate the material. The part can be wound cool. It can be removed from the mandrel immediately after winding. Some post heating and consolidation can be done to improve the properties of the part. In one embodiment, the blend material is pre-impregnated in a fiber tow.

In one embodiment, a process for polymerizing a macrocyclic polyester oligomer includes providing a macrocyclic polyester oligomer, providing a polymerization catalyst (or in the case of a blend material, providing a blend material having a macrocyclic polyester oligomer and a polymerization catalyst), heating to cause the macrocyclic polyester oligomer to melt, contacting the molten macrocyclic polyester oligomer and the polymerization catalyst with a fibrous strand, winding the fibrous strand onto a mandrel, and heating the macrocyclic polyester oligomer to cause its polymerization. In one embodiment, the process also includes the step of removing the resulting polymer while the resulting polymer is at substantially the same temperature of the polymerization and the resulting polymer solidifies into a solid at the polymerization temperature. In one embodiment, no cooling of the mold is conducted before demolding or before the start of the next round of processing with the mold. In another embodiment, some cooling of the mold is conducted before demolding or the start of the next round of processing. In one embodiment, a macrocyclic PBT oligomer is polymerized using the resin film infusion processes described here.

In another embodiment, a filler is placed into the mold in which the filler is mixed with the macrocyclic polyester oligomer and the polymerization catalyst. In another embodiment, a filler is mixed with the macrocyclic polyester oligomer and the polymerization catalyst before being placed in the mold. In yet another embodiment, a filler is part of the blend material.

g. Compression Molding

Referring to FIG. 10, compression molding, stamping, or pressing, is a process for making plastic composite parts that are thin and generally flat with mild features and contours such as truck and auto body panels, bumper beams, various trays and machine housings. In one aspect of the invention, compression molding is used to manufacture articles from macrocyclic polyester oligomers. A press 1010 has a press frame 1020. Within the press 1010 are top die 1030 and lower die 1040. A prepreg or sheet molding compound (SMC) 1050 is placed between the top die 1030 and the lower die 1040 within the press 1010. The prepreg or molding compound 1050 typically is heated and stamped under heat and pressure and then removed. A SMC or sheet molding compound refers to a highly filled compound with a resin binder that is placed in a hot matched metal tool and compressed to evenly fill the mold and solidify into a net or near net shape part.

In one embodiment of the invention, a macrocyclic polyester oligomer is polymerized using compression molding.

In one embodiment, a process for polymerizing a macrocyclic polyester oligomer includes providing a macrocyclic polyester oligomer, providing a polymerization catalyst (or in the case of a blend material, providing a blend material having a macrocyclic polyester oligomer and a polymerization catalyst), providing a fibrous base material, heating to cause the macrocyclic polyester oligomer to melt, and loading the molten macrocyclic polyester oligomer and the polymerization catalyst onto the fibrous base material, pressing the dies of the mold, and heating or otherwise to cause polymerization of the macrocyclic polyester oligomer. In one embodiment, the process also includes the step of removing the resulting polymer while the resulting polymer is at substantially the same temperature of the polymerization and the resulting polymer solidifies into a solid at the polymerization temperature. In one embodiment, no cooling of the mold is conducted before demolding or before the start of the next round of processing with the mold. In another embodiment, some cooling of the mold is conducted before demolding or the start of the next round of processing.

In another embodiment, a filler is placed into the mold in which it is mixed with the macrocyclic polyester oligomer and the polymerization catalyst. In another embodiment, a filler is mixed with the macrocyclic polyester oligomer and the polymerization catalyst before being placed in the mold. In yet another embodiment, a filler is part of the blend material.

In one embodiment, a macrocyclic PBT oligomer is polymerized using the resin film infusion processes described here. In the case of PBT, the cycle time can be greatly reduced because the processing temperature is below the melting point of the resulting PBT polymer. In one embodiment, macrocyclic polyester oligomers are used to make high quality thermoplastic composite parts with powder coated fabric.

h. Roll wrapping

Referring to FIG. 11, roll wrapping is a process for making tubular articles such as composite golf shafts, windsurfing masts and various tie rods for aircraft. In one aspect of the invention, roll wrapping processes are used to manufacture articles from macrocyclic polyester oligomers. The tubular articles can be round, elliptical, or even rectangular cross sections. They can be tapered as well. A mandrel 1110 that serves as the forming core is placed on the edge 1120 of a layer of prepreg sheet 1130. The prepreg sheet 1130 is rolled onto the mandrel 1110. Proper tack on the prepreg sheet 1130 allows the mandrel 1110 to pick up the prepreg sheet 1130 to begin the wrapping process, and to allow the layers to adhere to one another. The fiber orientation 1140 may be alternated in a sequence of layers, so as to distribute strength as desired. The assembly can be wrapped tightly in shrink-wrap tape that shrinks when heated to apply pressure to the composite as it consolidates. In one embodiment, the assembly is heated to cause polymerization. In one embodiment, a macrocyclic polyester oligomer and a polymerization catalyst is impregnated in a sheet of reinforcing fibers to form the prepreg. The tack allows multiple uncured layers to stick to one another during assembly, and the drape allows the uncured sheet to be easily contoured to the shape of the component. Illustrative examples of such macrocyclic polyester oligomers are macrocyclic poly (1,4-butylene terephthalate) (PBT), poly(1,3-propylene terephthalate) (PPT), poly(1,4-cyclohexylenedimethylene terephthalate) (PCT), poly(ethylene terephthalate) (PET), and poly(1,2-ethylene 2,6-naphthalendicarboxylate) (PEN) oligomers and copolyester oligomers comprising two or more of the above monomer repeat units.

In one embodiment, a process for polymerizing a macrocyclic polyester oligomer includes rolling onto a mandrel a base material having thereon pre-impregnated a macrocyclic polyester oligomer and a polymerization catalyst (or in the case of a blend material, a blend material having a macrocyclic polyester oligomer and a polymerization catalyst), and heating or otherwise to cause polymerization of the macrocyclic polyester oligomer. In one embodiment, the blend material as described above is impregnated in a unidirectional prepreg and is processed by a roll wrapping process. In one embodiment, the process also includes the step of removing the resulting polymer while the resulting polymer is at substantially the same temperature of the polymerization and the resulting polymer solidifies into a solid at the polymerization temperature. In one embodiment, no cooling of the mold is conducted before demolding or before the start of the next round of processing with the mold. In another embodiment, some cooling of the mold is conducted before demolding or the start of the next round of processing. In one embodiment, a macrocyclic poly(1,4-butylene terephthalate) oligomer is polymerized using the resin film infusion processes described here.

In another embodiment, a filler is also pre-impregnated. In another embodiment, a filler is mixed with the macrocyclic polyester oligomer and the polymerization catalyst before being impregnated onto the base material. In yet another embodiment, a filler is part of the blend material having a macrocyclic polyester oligomer and a polymerization catalyst.

i. Powder Coating

Another type of prepreg is powder coating. Powder coatings are done through electrostatic or other processes. Referring to FIG. 12, an electrostatic powder coating involves placing a powder 1205 in a chamber 1210 that has tiny holes 1215 in the bottom 1220 that air (or other gases) are forced through. As the gas passes through the powder it begins to bubble and flow like a fluid; this is known as a fluidized bed 1225. The powder particles in the fluidized bed 1225 can then be charged electrostatically forming charged resin particles 1227 and will adhere electrostatically, upon heating at a heating zone 1229, to a solid substrate that passes through the charged fluidized powder, such as a fiber tow or fabric 1230. The fiber tow or fabric is then brought to roll onto a roller 1240.

In another embodiment, charged powder particles are sprayed through a nozzle. The powder particles adhere electrostatically to the sold substrate used to receive them. In one embodiment, charged powder particles are sprayed using an electrostatic powder spraying technique. In one embodiment, the powder is stored in a reservoir with caking being prevented by slow stirring with an agitator. In another embodiment, air fluidization of the bed is used as an alternative to mechanical stirring. The powder is conveyed to the electrostatic spray head by air motion. In one embodiment, the spray head is fastened onto a gun-like holder for convenience of operation. An orifice is fitted onto the spray head. Before the powder particles leave the orifice, they are electrostatically charged by internal electrodes connected to a high-tension generator. The target substrate to be sprayed with the powder is attached to an electrically grounded holder. The powder is projected towards the target by the flow of air. The target is electrically grounded so that the powder particles will adhere during subsequent operations where the sprayed sheets must be handled. The thickness of the powder layer laid down by the electrostatic spraying technique is primarily a function of the total charge of powder deposited on the target, which in turn is a function of the voltage applied.

In one embodiment, powder coating is used to deposit a uniform coating of a powder material onto a receiving substrate. Illustrative examples of receiving substrates include paper, metals, plastics, carbon, glass, and aramid fibers. The receiving substrate is usually moving in a continuous process. The powder is heated or treated in other ways to make the powder adhere to or soak into the receiving substrate. Thermoset resin powders are currently applied to a variety of fibrous materials to make prepregs or coatings for paper or metals. Thermoplastic powders are used to create prepregs in an attempt to get a better connection between the reinforcing fibers and thermoplastic matrix. Still, even powder coated thermoplastic prepregs are difficult to use because conventional thermoplastic materials have high melt viscosity and do not wet out fibers well and have long heat up and cool down cycles when making parts. Thus, conventional thermoplastic materials are difficult to use to produce high quality composites.

In one embodiment, a blend material containing a macrocyclic polyester oligomer and a polymerization catalyst is used in a powder coating system, for example, in an electrostatic powder coating process. The macrocyclic polyester oligomer is slightly melted to adhere to the fiber and used as a prepreg in an uncured state. Such a prepreg is then processed under heat and pressure to allow the resin to flow and polymerize to produce high quality composites with good surface finish and fiber wet out. The low melt viscosity of macrocyclic polyester oligomers make them process like a thermoset although they can produce thermoplastics.

j. Water Slurry Process

Preparation of prepregs from solid polymer precursors and substrate fibers can be conducted by a number of methods as mentioned above. Often, the impregnation process needs to be conducted under a limited time/temperature process window to avoid premature curing of the resin. While the use of organic solvents allows a process to be performed under a wider ranges of time and temperature, the cost associated with solvent recovery and environmental control may be problematic.

An aqueous suspension or slurry of polymers or polymer-precursors can be used to coat fiber substrates to prepare pre-impregnated sheets for production of fiber-reinforced composites. Many vinyl polymers are available in aqueous forms produced by emulsion or suspension polymerization. However, such aqueous systems are generally not available for polycondensation polymers and their precursors. Typically, when a solid powder of a macrocyclic polyester oligomer is combined with water, it does not mix well because of a large difference in surface energy between the solid particles and water. The addition of a water-miscible organic solvent such as methanol, ethanol, iso-propanol, acetone, etc., can help the macrocyclic polyester oligomer or the polymerization catalyst to dissolve. This may, however, result in the generation of environmentally undesirable volatile organic compounds (VOCs). On the other hand, use of aqueous suspension of the resin is inherently low cost and avoids the use of VOCs. Macrocyclic polyester oligomers such as macrocyclic poly(1,4-butylene terephthalate) oligomer (macrocyclic PBT oligomer) can be prepared into a stable aqueous mixture or, more preferably, a suspension with the aid of a trace amount of various surfactants.

As used here, a "suspension" means a fluid containing homogeneously suspended fine particles, depending on the physical appearance such as thickness it may also be called a slurry or simply a mixture. A "slurry" means a fluid containing fine powders suspended with the help of surfactants. A "mixture" means a fluid containing liquid mixed with fine powders.

Making a Water Suspension or Slurry

The water slurry process can be used to manufacture articles from macrocyclic polyester oligomers. In one embodiment, a process for preparing a suspension of a macrocyclic polyester oligomer and a polymerization catalyst includes contacting the macrocyclic polyester oligomer and the polymerization catalyst with water and a surfactant and mixing the macrocyclic polyester oligomer and the polymerization catalyst with water and the surfactant thereby producing a suspension.

The step of mixing may be accomplished by any means so long as the resulting mixture is a suspension. Any physical mixing procedures that achieve a suspension may be employed. Therefore, conventional means of mixing, for example, mechanical agitation, sonication, and continuous circulation by pumping, may be employed. Such physical mixing may be facilitated by the addition of chemicals. Other illustrative examples of such processes include milling, solvent process followed by evaporation, etc. Solvents other than water may be added to facilitate the mixing, further processing, or both. In one embodiment, a solvent other than water is used to produce a suspension of macrocyclic polyester oligomers. For example, an organic solvent such as methylene chloride or ethyl alcohol may be employed. However, as mentioned above, this may result in the generation of VOCs. In a preferred embodiment, no solvent other than water is employed to produce a suspension of the macrocyclic polyester oligomer and the polymerization catalyst in water. Furthermore, the mixture may contain additional components such as a filler and other additives. Illustrative additives include colorants, pigments, filler, reinforcing fibers, magnetic materials, anti-oxidants, UV stabilizers, plasticizers, fire-retardants, lubricants, mold releases, etc.

In one embodiment, a small amount of a nonvolatile surfactant is employed to facilitate suspension formation and to increase suspension stability. In one embodiment, less than 2 weight percent of surfactant is employed. In another embodiment, less than 1 weight percent of surfactant is employed. In another embodiment, less than 0.05 weight percent of surfactant is employed. Commercially available surfactants are typically not volatile. The quantity that is required to facilitate suspension formation may be negligible in causing environmental effect. In the presence of a surfactant, wetting of solid powder is greatly facilitated. Typically, the resulting suspension is more stable, avoiding rapid settlement of the solid on standing. In one embodiment, the suspension is produced by milling a macrocyclic polyester oligomer and a polymerization catalyst in the presence of water and a surfactant.

Any surfactant that facilitates aqueous suspension formation and does not adversely interfere with the polymerization and the resulting polymerization products may be employed. In one embodiment, only one surfactant is employed. In another embodiment, two or more surfactants are employed. In one embodiment, a nonionic surfactant, such as, polyethylene glycol monoalkyl ether, is employed. In another embodiment, an ionic surfactant is employed. Ionic surfactants provide for added stability of the suspension by introducing surface electrical charges on dispersed solid particles. In one embodiment, an anionic surfactant is employed. Illustrative examples of anionic surfactants include sodium dodecylbenzenesulfonate, which is a common laundry detergent component, and sodium dodecyl sulfate. In another embodiment, a cationic surfactant is employed. Illustrative examples of cationic surfactants include dodecylpyridinium chloride, dodecyltrimethylammonium bromide, dodecyltriphenylphosphonium bromide, coco and tallow-based quaternary ammonium salts, and 1-octadecyl-3-methylimidazolinium bromide. In one embodiment, a surfactant that carries both a positive and a negative charge in the same molecule is employed. In one embodiment, a surfactant containing glycerin and sugar moieties as a polar group is employed. Surfactants containing glycerin and sugar moieties as a polar group may be advantageously employed to introduce branching and cross-linking in the final polymer.

The stability of suspensions depends on factors including particle size, concentration of solid, concentration of surfactant, etc. Typically, the smaller the particle size, the more stable is the resulting suspension. In one embodiment, a process for achieving small particle suspension is to mill the macrocyclic polyester oligomer with water and a surfactant. One advantage of this process is that it eliminates the potential problem of handling fine particle dust.

Certain polymerization catalysts, including many tin catalysts, pre-inoculated with the macrocyclic polyester oligomer were essentially not affected despite the presence of water and the surfactant during the suspension forming process. As described below, such catalysts are effective in catalyzing polymerization after the removal of water.

Prepreg Formation and Polymerization of MPOs

One embodiment of a prepreg formation process is depicted in FIG. 13. Fibers 1310 are released from the fiber rolls 1320 and are arranged into desired width, usually that of the prepreg to be produced. The fibers 1310 are then pulled into a bath 1330 that contains a water suspension or slurry 1340 of a macrocyclic polyester oligomer, a polymerization catalyst, and a surfactant, with or without additional filler or solvent. The fibers 1310 then are pulled into a drying oven 1350 wherein water is dried off. The fibers 1310 are then pulled into a fuse die 1360 that is heated to melt the macrocyclic polyester oligomer onto the fibers 1310. Depending on the die temperature and the rest time of the fibers 1310 in the fuse die 1360, the macrocyclic polyester oligomer may polymerize in the fuse die 1360. The fibers 1310 then go into a chill die 1370 to cool down. The prepreg is collected onto a drum 1380. The temperatures and hold times can be configured such that the MPOs fully or partially polymerize in the fuse die, or they can be polymerized later.

FIG. 14 shows another embodiment of a process that may be employed to make prepregs of a macro cyclic polyester oligomer, to polymerize a macrocyclic polyester oligomer, or both. Generally, the process involves a suspension 1410 of water, a macrocyclic polyester oligomer, a polymerization catalyst, and a surfactant, with or without additional filler or solvent. The suspension is applied through a funnel 1415 to a base material 1420 to form a layer 1430 of the mixture on the base material 1420. The layer 1430 of the suspension is heated to remove water from the suspension. Once dry, the remaining suspension is then pressed into a desired form between belts 1440 run by rollers 1450. The resulting prepreg may be left un-polymerized and partially consolidated or may be fully polymerized and consolidated (or some combination) depending on whether additional heating is applied after the drying step to cause polymerization of the macrocyclic polyester oligomer.

In one embodiment, a process for impregnating macrocyclic polyester oligomers for polymerization includes providing a suspension of a macrocyclic polyester oligomer and a polymerization catalyst in water, applying the suspension to a base material, drying the applied suspension to remove water, and pressing the dried applied suspension to a desired form.

The step of providing a suspension of a macrocyclic polyester oligomer and a polymerization catalyst in water is discussed above.

Applying the suspension to a base material may be accomplished by any means so long as the suspension contacts a receiving base material and forms thereon a layer of the suspension of a desired shape and thickness. Depending on the application, the thickness and/or shape of the layer of the applied suspension may not be important and, therefore, not monitored or controlled. Illustrative examples of methods for applying the suspension include dropping the suspension through a funnel with an appropriately sized and shaped opening and the use of a container that can be tilted or otherwise causing its content to spill over to the receiving base material. If it is useful to closely monitor and control the shape, thickness, and features of the resulted layer, additional devices may be included in the equipment to provide such monitoring or control.

The receiving base material may or may not become, after the water slurry process, part of the resulting prepreg or the partially or completely polymerized product. The base material may be a sheet of a polymer film or a paper coated with polymer film. The base material may be the surface of a portion of the processing equipment itself. The base material, if not to become a part of the prepreg or the polymerized product, may be removed after the step of applying the suspension and before the end of the water slurry process. Furthermore, the base material may include raised boundaries that help to contain the suspension and/or to achieve a certain shape, thickness, or features.

After applying the suspension to a base material, the applied suspension may be dried by any method so long as it results in the removal of water from the applied suspension. Illustrative examples of the methods for drying the applied suspension include heating, drying by blowing or bubbling a hot gas through or over the suspension, drying through a vacuum, or a combination of all or some of these or other methods. A component (other than water) of the applied suspension (e.g., a solvent such as ethyl alcohol) may be removed before further processing. The method used for removing water may be helpful or even sufficient in removing certain solvents. Thus, an additional step may or may not be needed. Depending on the nature of the component(s) to be removed, a removal step may be carried out before, during, or after the step of applying the suspension. As indicated above, VOCs are preferably avoided.

Pressing may be accomplished by any means so long as the desired form results. A desired form may include certain shape, thickness, and features. Thus, vacuum forming, double rolling, and/or a die may be used in shaping the product into the desired form. In applications in which polymerization is carried out, pressing may be conducted before, during, or after polymerization. Also, pressing may or may not apply to the base material depending on the application. Similarly, the base material, if it is to be removed, may be removed before, during, or after pressing. Furthermore, pressing may not be needed in certain applications where the form of the prepreg or polymerized product need not be controlled or may be achieved by the other steps of the water slurry process.

Depending on the application, immediate polymerization of the macrocyclic polyester oligomer may or may not be desired. If it is desired, polymerization may be achieved by heating the applied suspension to a temperature sufficient to cause polymerization of the macrocyclic polyester oligomer. In one embodiment, heating is not employed and drying is achieved by other methods with no polymerization resulting from the drying step. In another embodiment, heating is employed to achieve drying but not to cause polymerization. In another embodiment, heating results in drying the suspension and partial polymerization of the macrocyclic polyester oligomer. In yet another embodiment, heating results in complete polymerization of the macrocyclic polyester oligomer.

In one embodiment, a double belt press system is employed in preparing prepregs from a macrocyclic polyester oligomer and a polymerization catalyst, with or without additional fillers. Referring to FIG. 14 again, the layer 1430 comprising a macrocyclic polyester oligomer and a polymerization catalyst, with or without additional fillers, is pressed between belts 1440 run by rollers 1450. The belts 1440 move with the layer 1430 while the layer 1430 is being pressed, heated, or both. Therefore, the temperature and period of heating may be configured such that the layer 1430 is fully polymerized, partially polymerized, or not polymerized. Similarly, the temperature and period of heating or cooling may be configured to achieve full or partial consolidation. The heat history may include any combination of heating step(s) and cooling step(s) in order to achieve the desired heat history. The material of layer 1430 may be a melt or a solid or a combination of the two along the way of the double belt press depending on the specific configurations of the temperature, the timing, and the pressure.

While FIG. 14 shows a double belt press system in the context of the water slurry process, applicability of the double belt press system is not limited to the water slurry process. The double belt press system can be used to prepare prepregs from macrocyclic polyester oligomers alone or in combination with other processes described herein to achieve the desirable prepregs.

In one embodiment, the polymerization catalyst present in the suspension is from 0.01 to 10.0 mole percent of the structural repeat units of the macrocyclic polyester oligomer. The polymerization catalysts that may be employed are as discussed above. In one embodiment, the process includes the additional step of heating the dried applied suspension to cause polymerization of the macrocyclic polyester oligomer. In one embodiment, a suspension of a macrocyclic polyester oligomer and a polymerization catalyst in water is provided using the process for making a water suspension or slurry described above.

A cooling step may or may not be needed depending on the application. In cases where cooling is not necessary, such as where drying is accomplished by methods other than heating and where no polymerization is carried out, the prepreg or product can be removed or demolded from the equipment soon after the water slurry process. If cooling is necessary, demolding can be carried out after the desired temperature has been achieved.

In one embodiment, the material processed by the above process includes a blend material. In one embodiment, a blend material containing a macrocyclic polyester oligomer and a polymerization catalyst is mixed with water and processed by a water slurry process. In one embodiment, the blend material further contains a filler.

In one embodiment, a macrocyclic polyester oligomer composition includes a macrocyclic polyester oligomer, a polymerization catalyst, and water. In one embodiment, the macrocyclic polyester oligomer composition further includes a surfactant. In one embodiment, the macrocyclic polyester oligomer composition further includes a filler and other additives such as pigments, mold releases and stabilizers. In one embodiment, a polyester polymer composite is prepared by drying the macrocyclic polyester oligomer composition followed by polymerization of the macrocyclic polyester oligomer.

In one embodiment, a process for impregnating a macrocyclic polyester oligomer for polymerization and for polymerizing a macrocyclic polyester oligomer includes mixing a blend material comprising a macrocyclic polyester oligomer and a polymerization catalyst with water with or without a surfactant to form a mixture, applying the mixture to a base material, drying the mixture to remove water, and pressing the dried mixture to form a prepreg.

In one embodiment, the blend material further includes a filler. In one embodiment, a polyester polymer composite is prepared by polymerizing a macrocyclic polyester oligomer according to the above process. In one embodiment, an article of manufacture is produced by the above process.

For certain applications, it may be desirable to form a suspension that can last for a long period of time without any components precipitating out of the suspension before the step of applying the mixture. For other applications, a suspension may be formed and substantial uniformity within the suspension kept by agitation and/or stirring before and during the step of applying the mixture.

In order to properly carry out the water slurry process and other processes described above, grinding may be necessary to reduce macrocyclic polyester oligomers into a powder form. Typically, macrocyclic polyester oligomers have a low molecular weight and can be ground into fine powder easily at ambient temperature thereby reducing the cost of material. Conventional thermoplastics like nylon and polypropylene are not as easy to grind at ambient temperature and need to be cooled or frozen. Certain conventional thermoplastics require very low (cryogenic) temperatures to make grinding possible thereby dramatically increasing the cost of material.

The success of a water slurry process in prepreg formation and polymerization of macrocyclic polyester oligomers was unexpected partly because the presence of water, in general, disrupts and can even entirely prevent the polymerization process from starting and progressing. Once the water is removed by drying, however, the polymerization process can take place uninterrupted. The water slurry process thus provides an effective and relatively inexpensive method for preparing prepreg and polymer from macrocyclic polyester oligomers.

EXAMPLES

The following examples are provided to further illustrate and to facilitate the understanding of the invention. These specific examples are intended to be illustrative of the invention. The products obtained from these examples may be confirmed by conventional techniques such as proton and carbon-13 nuclear magnetic resonance spectroscopy, mass spectroscopy, infrared spectroscopy, differential scanning calorimetry and gel permeation chromatography analyses.

Example A

The macrocyclic polyester oligomers used in the following example are macrocyclic copolyester oligomers with 95.0 mol % of PBT and 5.0 mol % of PET. The macrocyclic copolyester oligomers were prepared by heating a mixture of copolyester linears, organic solvents, such as o-xylene and o-dichlorobenzene, which are substantially free of oxygen and water, and tin or titanium compounds as transesterification catalysts.

A clean stainless steel reactor equipped with a magnetically coupled stirrer and heater with controls was charged with 4800 ml (4176 grams) of o-xylene, 59.2 grams (0.269 moles) of PBT pellets and 2.72 grams (0.0142 moles) of PET pellets to produce a 0.06 M polymer/o-xylene solution. The solution was heated to 100° C. and sparged with dry nitrogen until the moisture content of water was about 5 ppm. Sparging also removed the dissolved oxygen in the solvent and inerted the reactor. The reactor was then sealed. The mixture was heated to 220° C. After the temperature was stabilized, 3.5 mole % of catalyst, titanium butanediol (based on total moles of polyester monomer repeat units), were added to the system by pressure transferring the catalyst into the system with the aid of dry o-xylene (flushing the catalyst into the system to ensure complete transfer) and nitrogen. This marked time zero in the experiment. The resulting reaction mixture was sampled by removing 1–2 ml samples of the mixture periodically from the system using the system's pressure as the driving force and a small sintered filter placed in the system to provide the pressure drop to atmospheric conditions. The collected samples were analyzed by HPLC to determine yields of macrocyclic copolyester oligomers. After approximately one hour, the catalyst was quenched by the addition of water (0.20 mol) by adding the water in an o-xylene mixture. The water/o-xylene mixture was pressure transferred into the system, and the system was then allowed to cool to 75° C. with stirring in progress. The resulting reacted mixture was then filtered through a heated filter. Filtration resulted in removal of precipitated linear impurities (carboxylic acid terminated linear oligomers) from the system. The filtrate that contained the desired macrocyclic copolyester oligomers (dissolved in o-xylene at 75° C.) was then evaporated or roto-evaporated down to about 40 ml and then nonsolvent (pentane) was added to induce precipitation of the oligomers. The precipitated macrocyclic copolyester oligomers were filtered off and dried. Purity of the macrocyclic copolyester oligomers obtained was greater than 99%, indicated by no observable hydroxybutyl terminated linears in the product.

Example 1

Twenty milligrams of 1,1,6,6-tetra-n-butyl-1,6-distanna-2,5,7,10-tetraoxacyclodecane ("stannoxane-1") was dissolved with heating in approximately 2.5 ml of toluene which had been pre-dried by treating with 4A molecular sieves. The solution was cooled and poured into a glass jar containing 5.0 g of finely pulverized macrocyclic copolyester oligomer of PBT/PE (95/5 molar ratio). After intimately mixing the resulting uniform paste was dried under vacuum at about 50° C. The white crusty solid was pulverized by using a pestle and a mortar. The resulting uniform free flowing white powder contained 0.3 mole % of tin atoms per mole of the copolyester monomer repeat units.

Example 2

Example 1 was repeated except that 33.0 mg of stannoxane-1 catalyst was employed to give a blend containing 0.5 mole % of tin atoms per mole of the copolyester monomer repeat units.

Example 3

Di-n-butyltin oxide (24.89 g, 0.100 mole), 2,2-diethyl-1,3-propanediol (13.22 g, 0.100 mole) and 75 ml of toluene were placed in a 250 ml, three necked flask equipped with a Dean-Stark condenser. The mixture was stirred under nitrogen and heated to reflux for approximately 2 hours during which time approximately 1.7 ml of water was separated. The Dean-Stark condenser was replaced with another Dean Stark condenser filled with molecular sieves. The reaction mixture was further heated to reflux for an additional hour and then approximately 60 ml of the toluene was distilled off. Upon cooling, a white crystalline solid was obtained. The yield of 1,1-di-n-butyl-4,4-diethyl-1-stanna-2,5-dioxacyclohexane ("stannoxane-2") was 36.1 g.

Example 4

Approximately one gram of the blend obtained in Example 1 was placed in a 25 ml round bottom flask and it was blanketed with nitrogen. The flask was then dipped in an oil bath maintained at 190° C. The powder completely melted in one minute to form an easy-to-flow colorless liquid. The viscosity of the liquid gradually increased within a period of 2 to 3 minutes and then started to solidify with crystallization, resulting in formation of a tough porcelain white solid. The polymerization was complete in 10 minutes.

Examples 5

Stannoxane-2 (26 mg, 0.0727 mmol) was dissolved in 2 g of dry toluene. The solution was added to 4.0 g of the macrocyclic copolyester oligomers obtained in Example A in a jar. The content was mixed to form a homogeneous white paste. The paste was dried under vacuum in an oven at approximately 50° C. The crusty solid blend obtained was ground to obtain uniform powder containing 0.4 mole % tin atoms per mole of the copolyester monomer repeat units.

Example 6

Example 5 was repeated except that 13 mg of stannoxane-2 catalyst was used to give a blend containing 0.2 mole % tin atoms per mole of the copolyester monomer repeat units.

Example 7

Example 5 was repeated except that 6.5 mg of stannoxane-2 catalyst was used to give a blend containing 0.1 mole % tin atoms per mole of the copolyester monomer repeat units.

Examples 8–10

Blend materials obtained in Examples 5–7 were subjected to test polymerization. One hundred milligrams of each sample were placed in a one-gram screw-cap vial. The vial was capped under nitrogen. The vial was then dipped in a 190° C. oil bath. The blend melted in 50–60 seconds to form a colorless fluid. Table 2 shows the times taken to show marked viscosity increase and to observe a porcelain-white solid following crystallization.

TABLE 2

Polymerization of the blends

| | Stannoxane-2 Conc. (mol %) | Time to show Viscosity increase (min) | Start of crystallization (min) |
|---|---|---|---|
| Example 8 | 0.4 | 1.5 | 4.5 |
| Example 9 | 0.2 | 2 | 6 |
| Example 10 | 0.1 | 10 | 18 |

Example 11
(Pultrusion 1, Glass Ribbon)

Pultrusion was done using one end of FGI (Fiber Glass Industries), 113 yd/lb yield, standard sizing "Flexstrand" fiberglass roving, and was pulled at a rate of 12 inch/min, first through a preheating die at 200° C. (4 inch long, ½ inch×0.025 inch cross section). The blend powder obtained in Example 1 was then placed on the fibers as they entered a tapered die (4 inch long, ½ inch×0.070 inch at the entrance, and ½ inch×0.015 inch at the exit) that was heated to 200° C. The powder melted and polymerized in the die (polymerization indicated by (1) molecular weight of 50k obtained from GPC analysis, and (2) the apparently high flexural strength as compared to that of the uncatalyzed macrocyclic oligomers which is extremely low), and exited in a molten but highly viscous state, followed by rapid crystallization within 2 inches of the die, indicated by a visual change from clear to opaque (light tan in color).

Example 12
(Pultrusion 2, Carbon Ribbon)

This example is the same as Example 11 except that the fiberglass is replaced with Zoltek, 413 ft/lb yield, X-10 sizing, 48k filament count, carbon fiber. The resulting ribbon also displayed good mechanical strength, and the resulting polymer had molecular weight of 50k based on GPC analysis.

Example 13
(Pultrusion 3, Glass Rod)

This example was run at 15 inch/min pull rate, used 3 strands of FGI, 113 yd/lb yield, standard sizing "Flexstrand" fiberglass roving, with a preheated die at 200° C. The blend material (in powder form) obtained in Example 1 was placed on the fibers as they entered a tapered, round die heated to 200° C. (0.25 inch diameter at the entrance, reducing to 0.125 inch at 1 inch from the entrance, and a constant 0.125 inch diameter for the remaining 7 inch of the 8 inch long die). The resulting rod was substantially structural. The resulting polymer had a molecular weight of 50k based on GPC analysis.

Example 14
(Unidirectional Prepreg)

One gram of macrocyclic PBT oligomer blend material with stannoxane-1 catalyst is dissolved in 2 grams of methylene chloride (about 66% by weight of solvent), and combined with about 1 gram of carbon fiber on a plastic sheet. After the solvent flashed off, the sample was dry and looked powdery. The powder did not flake off during handling. The prepreg was then processed in a press, compression molding, at about 20 psi for 3 minutes at about 200° C. using Teflon sheets. The resulting sheet was significantly structural.

Example 15
(Compression Molding)

Four layers of dry, 5.7 oz./square yard carbon fabric were used with cyclic PBT blend material spread over the surface, at a fiber to resin weight ratio of 2:1. The layers with coating ("the sample") was placed in a heated platen press, at a temperature of about 190° C., and held at low pressure (less than 5 psi) for 3 minutes. The sample was then pressed at 200 psi for an additional 17 minutes. The sample was removed hot, i.e., without cooling the press. The sample was crystallized and firm.

Example 16
(Water Slurry)

A blend material of macrocyclic PBT oligomer was prepared by the process of Example 1, using the catalyst of stannoxane-1. The blend material was ground to fine powder. The blend material was then mixed with water and/or ethyl alcohol to create a slurry. The mixture was allowed to remain in suspension for at least 24 hours. The material was then heated to remove water and further heated to cause polymerization of the macrocyclic PBT oligomer. The polymerization results are listed in Table 3.

TABLE 3

Water Slurry Process Results (PBT/[Stannoxane-1])

| Test Id. | Components of mixture in equal weight | Mixture Description | Mw | % Conversion[a] |
|---|---|---|---|---|
| a | macrocyclic PBT, Ethyl alcohol | miscible | 126,030 | Medium[b] |
| b | macrocyclic PBT, Ethyl alcohol, water | miscible | 147,300 | High[b] |
| c | macrocyclic PBT (control) | n/a | 155,722 | High[b] |
| d | macrocyclic PBT, water | suspension | 146,698 | High[b] |

[a]% Conversion is from macrocyclic poly(1,4-butylene terephthalate) oligomer to linear polymer.
[b]High = 95–100%; Medium = 90–95%; Low = less than 90%.

The procedure was then repeated except that the catalyst in the blend material was different. The catalyst used here was commercially available butyltin dihydroxide chloride (FASCAT™4101 from Atochem). The polymerization results are listed in Table 4.

TABLE 4

Water Slurry Process Results (PBT/[FASCAT ™ 4101])

| Test Id. | Components of mixture in equal weight | Mixture Description | Mw | % Conversion[a] |
|---|---|---|---|---|
| e | macrocyclic PBT, Ethyl alcohol | miscible | 79,439 | Medium[b] |
| f | macrocyclic PBT, Ethyl alcohol, water | miscible | 91,669 | Medium[b] |
| g | macrocyclic PBT (control) | n/a | 126,539 | High[b] |
| h | macrocyclic PBT, water | suspension | 108,213 | Medium[b] |

[a]% Conversion is from macrocyclic poly(1,4-butylene terephthalate) oligomer to linear polymer.
[b]High = 95–100%; Medium = 90–95%; Low = less than 90%.

Example 17

(Water Slurry Prepreg)

A blend material of macrocyclic PBT oligomer was prepared by the process of Example 1, using the catalyst of stannoxane-1. The blend material was ground to fine powder. The blend material was then mixed with water and/or ethyl alcohol to create a slurry. The mixture was allowed to remain in suspension for at least 24 hours. Unsized AS4 type carbon fiber was then dipped into the slurry and removed with a slurry coating. The coated fiber was then dried under vacuum for 30 minutes at 80° C. to form the prepreg. The prepreg was cut into ½ inch pieces, stacked randomly between steel sheets, wrapped in aluminum foil, dried again under vacuum for 30 minutes at 80° C., and pressed at 190° C. for 30 minutes, to make a composite plate. The polymerization result for the resin in the plate is given in Table 5.

TABLE 5

Water Slurry Prepreg Process Results (PBT/[Stannoxane-1])

| Test Id. | Mw | % Conversion[a] |
|---|---|---|
| JEG1 | 136,000 | High[b] |

[a]% Conversion is from macrocyclic poly(1,4-butylene terephthalate) oligomer to linear polymer.
[b]High = 95–100%; Medium = 90–95%; Low = less than 90%.

The procedure was then repeated except that the catalyst in the blend material was different. The catalyst used here was FASCAT™4101. The polymerization result for the resin in the plate is given in Table 6.

TABLE 6

Water Slurry Prepreg Process Results (PBT/[FASCAT ™ 4101])

| Test Id. | Mw | % Conversion[a] |
|---|---|---|
| JEG2 | 115,000 | High[b] |

[a]% Conversion is from macrocyclic poly(1,4-butylene terephthalate) oligomer to linear polymer.
[b]High = 95–100%; Medium = 90–95%; Low = less than 90%.

Example 18

(Water Slurry)

The cyclic oligomer employed was a macrocyclic co-polyester oligomer (c-PBT) with 95mol % poly(butylene terephthalate) repeat units and 5 mol % of poly(ethylene terephthalate) repeat units. Two types of the blend material were formulated. The first blend of macrocyclic c-PBT oligomer contained homogeneously distributed stannoxane-1. The concentration of the catalyst was 0.3 mol % of tin atom based on total moles of monomer repeat units. The second blend contained 0.4 mol % of FASCAT™4101.

(1) General Procedure for Making Aqueous Suspension

Nine grams of macrocyclic c-PBT oligomer blend containing a polymerization catalyst, 21 ml of water, and a surfactant as indicated were placed in a 100 ml screw-cap glass bottle along with five 7/16" stainless steel balls. The tightly capped bottle was then tumbled for 2 hours. A stable white milky suspension was obtained.

(2) Polymerization

Approximately 5.4 g of the aqueous suspension were spread on the bottom of a 100 ml beaker and it was dried at 60° C. under vacuum in an oven. The dried solid powder (0.20g) was then placed in a 5 ml test tube. A vacuum was applied and the test tube was immersed in a 190° C. oil bath. The macrocyclic c-PBT oligomer melted to form a fluid liquid during a period of 2 min after which heating was continued under argon atmosphere. Total polymerization time was 20 min for samples containing 0.3 mol % of stannoxane-1 and 30 min for samples containing 0.4 mol % of FASCAT™4101.

Results from samples containing an anionic surfactant, various cationic surfactants, and a non-ionic surfactant are summarized in Tables 7, 8, and 9, respectively.

TABLE 7

Suspensions Prepared with Anionic Surfactant

| Sample | Polym. Catalyst (mol %) | Surfactant[a] (ppm) | Suspension Drying Cond. | Polym. time | Conv (%) | $M_p$[b] ($10^3$) |
|---|---|---|---|---|---|---|
| Control | Stannoxane-1 (0.3) | Original powder, not suspension | | 20 min | 97.8 | 140.6 |
| i | Stannoxane-1 (0.3) | NaDBS (50) | 60° C./vacuum | 20 min | 93.6 | 131.2 |
| j | Stannoxane-1 (0.3) | NaDBS (200) | 60° C./vacuum | 20 min | 95.6 | 133.2 |
| k | Stannoxane-1 (0.3) | NaDBS (200) | 110~120° C./in air | 20 min | 91.0 | 130.4 |
| l | Stannoxane-1 (0.3) | NaDBS (1000) | 60° C./vacuum | 20 min | 92.9 | 125.3 |
| m | FASCAT ™ 4101 (0.4) | Original powder, not suspension | | 30 min | 94.8 | 123.9 |
| n | FASCAT ™ 4101 (0.4) | NaDBS (200) | 60° C./vacuum | 30 min | 94.8 | 114.0 |

[a]NaDBS: Sodium dodecylbenzenesulfonate
[b]Peak molecular weight determined by GPC.

TABLE 8

Suspensions Prepared with Cationic Surfactants

| Sample | Polym. Catalyst (mol %) | Surfactant[a] (ppm) | Suspension Drying Cond. | Polym. time | Conv (%) | $M_p$[b] ($10^3$) |
|---|---|---|---|---|---|---|
| o | Stannoxane-1 (0.3) | DPyr (200) | 60° C./vacuum | 20 min | 93.1 | 131.9 |
| p | Stannoxane-1 (0.3) | Im (200) | 60° C./vacuum | 20 min | 94.4 | 134.8 |
| q | Stannoxane-1 (0.3) | DTPP (200) | 60° C./vacuum | 20 min | 95.2 | 136.8 |
| r | Stannoxane-1 (0.3) | DTMAB (200) | 60° C./vacuum | 20 min | 95.9 | 141.3 |
| s | FASCAT ™ 4101 (0.4) | DPyr (200) | 60° C./vacuum | 30 min | 94.0 | 116.2 |

[a]DPyr: Dodecylpyridinium chloride; Im: 1-Octadecyl-3-methylimidazolium bromide; DTPP: Dodecyltriphenylphosphonium bromide; DTMAB: Dodecyltrimethylammonium bromide.
[b]Peak molecular weight determined by GPC.

TABLE 9

Suspension Prepared with Non-ionic Surfactant

| Sample | Polym. Catalyst (mol %) | Surfactant[a] (ppm) | Suspension drying | Polym. time | Conv (%) | $M_p$[b] ($10^3$) |
|---|---|---|---|---|---|---|
| t | FASCAT ™ 4101 (0.4) | Brij 30 ™ (200) | 60° C./vacuum | 30 min | 94.0 | 122.6 |

[a]Brij 30: Tetra(ethylene glycol) monododecyl ether.
[b]Peak molecular weight determined by GPC.

The chemical stability of the aqueous suspensions may vary depending on the environment and chemical nature of the components. Tables 10–11 show the effect of catalyst, surfactant, and polymerization time on the molecular weight of polyesters obtained.

TABLE 10

Chemical Stability of Suspension-1

| Sample | Polym. Catalyst (mol %) | Surfactant[a] (ppm) | Suspension Time (at RT) | Polym. time | Conv (%) | $M_p$[b] ($10^3$) |
|---|---|---|---|---|---|---|
| Control | FASCAT ™ 4101 (0.4) | Original dry powder | | 30 min | 94.8 | 123.9 |
| Control | FASCAT ™ 4101 (0.4) | Only $H_2O$ | 2 h | 30 min | 93.1 | 123.9 |
| u | FASCAT ™ 4101 (0.4) | DPyr (200) | 2 h | 30 min | 94.0 | 116.2 |
| v | FASCAT ™ 4101 (0.4) | DPyr (200) | 11 days | 30 min | 89.4 | 100.1 |
| w | FASCAT ™ 4101 (0.4) | NaDBS (200) | 2 h | 30 min | 94.8 | 114.0 |

[a]DPyr: Dodecylpyridinium chloride (cationic); NaDBS: Sodium dodecylbenzenesulfonate (anionic).
[b]Peak molecular weight determined by GPC.

TABLE 11

Chemical Stability of Suspension-2

| Sample | Polym. Catalyst (mol %) | Surfactant[a] (ppm) | Suspension Time (at RT) | Polym. time | Conv (%) | $M_p$[b] ($10^3$) |
|---|---|---|---|---|---|---|
| Control | Stannoxane-1 (0.3) | Original dry powder | | 20 min | 97.8 | 140.6 |
| Control | Stannoxane-1 (0.3) | Only $H_2O$ | 2 h | 20 min | ~95 | 134.8 |
| x | Stannoxane-1 (0.3) | DTMAB (200) | 2 h | 20 min | 95.9 | 141.3 |
| xx | Stannoxane-1 (0.3) | DTMAB (200 | 12 days | 20 min | 97.5 | 137.8 |
| y | Stannoxane-1 (0.3) | NaDBS (200) | 2 h | 20 min | 93.4 | 138.7 |
| yy | Stannoxane-1 (0.3) | NaDBS (200) | 11 days | 20 min | 93.2 | 124.4 |

[a]DTMAB: Dodecyltrimethylammonium bromide (cationic); NaDBS: Sodium dodecylbenzenesulfonate (anionic).
[b]Peak molecular weight determined by GPC.

Each of the patent documents disclosed hereinabove is incorporated by reference herein. Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A process for preparing a suspension of a macrocyclic polyester oligomer and a polymerization catalyst in water, said process comprising the steps of
    (a) contacting said macrocyclic polyester oligomer and polymerization catalyst with water and a surfactant, and
    (b) mixing said macrocyclic polyester oligomer and polymerization catalyst with said water and said surfactant thereby forming a suspension.

2. The process of claim 1 wherein step (a) comprises contacting said macrocyclic polyester oligomer and polymerization catalyst with water and a nonionic surfactant.

3. The process of claim 2 wherein said nonionic surfactant is polyethylene glycol monoalkyl ether.

4. The process of claim 1 wherein step (a) comprises contacting said macrocyclic polyester oligomer and polymerization catalyst with water and an anionic surfactant.

5. The process of claim 4 wherein said anionic surfactant is sodium dodecylbenzenesulfonate.

6. The process of claim 1 wherein step (a) comprises contacting said macrocyclic polyester oligomer and polymerization catalyst with water and a cationic surfactant.

7. The process of claim 6 wherein said cationic surfactant is selected from a group consisting of dodecylpyridinium chloride, dodecyltrimethylammonium bromide, dodecyltriphenylphosphonium bromide, and 1-octadecyl-3-methylimidazolinium bromide.

8. The process of claim 1 wherein step (a) comprises contacting said macrocyclic polyester oligomer and polymerization catalyst, water, a surfactant, with a solvent.

9. The process of claim 1 wherein step (a) comprises milling said polymeric material in the presence of water and a surfactant.

10. A process for impregnating macrocyclic polyester oligomers for polymerization comprising the steps of:
    (a) providing a suspension of a macrocyclic polyester oligomer and a polymerization catalyst in water;
    (b) applying said suspension to a base material;
    (c) drying to remove water from said applied suspension; and
    (d) pressing said dried applied suspension to a desired form.

11. The process of claim 10 wherein step (a) comprises providing a suspension of a macrocyclic polyester oligomer and a polymerization catalyst in water, and wherein said macrocyclic polyester oligomer and said polymerization catalyst are components of a blend material.

12. The process of claim 10 wherein step (a) comprises providing a suspension of a macrocyclic polyester oligomer and a polymerization catalyst in water, and wherein said polymerization catalyst is present in an amount from 0.01 to 10.0 mole percent of said structural repeat units of said macrocyclic polyester oligomer.

13. The process of claim 10 wherein step (a) comprises providing a suspension of a macrocyclic polyester oligomer and a polymerization catalyst in water, and wherein said macrocyclic polyester oligomer comprises at least one of a homo- and co-polyester oligomer.

14. The process of claim 10 wherein step (a) comprises providing a suspension of a macrocyclic polyester oligomer and a polymerization catalyst in water, and wherein said polymerization catalyst is a tin compound.

15. The process of claim 10 wherein step (a) comprises providing a suspension of a macrocyclic polyester oligomer and a polymerization catalyst in water, and wherein said polymerization catalyst is a titanate compound.

16. The process of claim 10 further comprising, after step (c), the step of heating said dried applied suspension to cause polymerization of said macrocyclic polyester oligomer.

17. An article of manufacture comprising the polymerized applied mixture of claim 16.

18. The process of claim 10 wherein step (c) comprises heating said applied mixture.

19. A process for impregnating macrocyclic polyester oligomers for polymerization using the process of claim 1, said method comprising the steps of:
    (a) providing a suspension of a macrocyclic polyester oligomer and a polymerization catalyst in water by performing the process of claim 1;
    (b) applying said suspension to a base material;
    (c) drying to remove water from said applied suspension; and
    (d) pressing said dried applied suspension to a desired form.

20. A composition of macrocyclic polyester oligomer comprising:
    (a) a macrocyclic polyester oligomer;
    (b) a polymerization catalyst; and
    (c) water.

21. The composition of claim 20 further comprising a surfactant.

22. The composition of claim 20 further comprising a filler.

23. A polyester polymer composite prepared by drying the composition of claim 20 and polymerizing said macrocyclic polyester oligomer.

24. An article of manufacture comprising said polyester polymer composite of claim 23.

25. A process for impregnating macrocyclic polyester oligomers for polymerization comprising the steps of:
   (a) mixing a blend material comprising a macrocyclic polyester oligomer and a polymerization catalyst with water to form a mixture;
   (b) applying said mixture to a base material;
   (c) drying to remove water from said applied mixture;
   (d) heating said dried applied mixture to polymerize said macrocyclic polyester oligomer; and
   (e) pressing said polymerized applied mixture to a desired form.

26. A polyester polymer composite prepared by polymerizing said macrocyclic polyester oligomer of claim 25.

27. An article of manufacture comprising said polyester polymer composite of claim 26.

28. The process of claim 1 wherein said macrocyclic polyester oligomer and said polymerization catalyst are components of a blend material.

29. The composition of claim 20 wherein said macrocyclic polyester oligomer and said polymerization catalyst are components of a blend material.

* * * * *